(12) United States Patent
Gmitro et al.

(10) Patent No.: US 10,722,991 B2
(45) Date of Patent: Jul. 28, 2020

(54) ENTRANCE FLOOR SYSTEM

(71) Applicant: E.M.E.H., Inc., Lebanon, NJ (US)

(72) Inventors: Jeff Gmitro, Del Rio, TX (US);
Matthew Umbriac, Milton, PA (US);
Charlie Brown, Lebanon, NJ (US)

(73) Assignee: E.M.E.H., INC., Lebanon, NJ (US)

( * ) Notice: Subject to any disclaimer, the term of this patent is extended or adjusted under 35 U.S.C. 154(b) by 0 days.

(21) Appl. No.: 15/130,142

(22) Filed: Apr. 15, 2016

(65) Prior Publication Data

US 2016/0229008 A1    Aug. 11, 2016

Related U.S. Application Data

(63) Continuation of application No. 14/063,849, filed on Oct. 25, 2013, now Pat. No. 9,340,983.

(51) Int. Cl.
*B23P 15/12* (2006.01)
*E04F 15/02* (2006.01)
(Continued)

(52) U.S. Cl.
CPC ............ *B23P 15/12* (2013.01); *A47L 23/266* (2013.01); *C25D 11/16* (2013.01);
(Continued)

(58) Field of Classification Search
CPC ................ B23P 15/12; E04F 15/02188; E04F 15/02161; C25D 11/16; A47L 23/266;
(Continued)

(56) References Cited

U.S. PATENT DOCUMENTS

| 82,647 A | 9/1868 | Shepard |
| 344,704 A | 6/1886 | Whiteley |
| (Continued) | | |

FOREIGN PATENT DOCUMENTS

| CN | 101111650 | 1/2008 |
| CN | 201202247 | 3/2009 |
| (Continued) | | |

OTHER PUBLICATIONS

U.S. Appl. No. 12/432,587 (U.S. Pat. No. 8,291,670), filed Apr. 29, 2009 (Oct. 23, 2012).
(Continued)

*Primary Examiner* — Charles R Kasenge
(74) *Attorney, Agent, or Firm* — Baker Botts L.L.P.

(57) ABSTRACT

An entrance floor system is provided. The entrance floor system includes a base mat and a plate. The base mat has opposing bottom and top surfaces. The bottom surface of the base mat is configured to rest on a floor surface. The plate has opposing bottom and top surfaces. The bottom surface of the plate is configured to rest on the top surface of the base mat. The top surface of the plate has a border region and a non-border region. The non-border region is substantially parallel with the bottom surface of the plate and the non-border region has a pattern machined therein. The pattern includes a plurality of slots. At least one slot is configured to receive fluid and debris. The top surface of the plate in the border region includes a transition from the floor surface to the non-border region of the top surface of the plate.

23 Claims, 35 Drawing Sheets

(51) Int. Cl.
  *A47L 23/26* (2006.01)
  *C25D 11/16* (2006.01)
(52) U.S. Cl.
  CPC .. *E04F 15/02161* (2013.01); *E04F 15/02188* (2013.01); *Y10T 83/04* (2015.04); *Y10T 408/03* (2015.01); *Y10T 428/24612* (2015.01)
(58) Field of Classification Search
  CPC ............ Y10T 428/24612; Y10T 83/04; Y10T 408/03
  See application file for complete search history.

(56) References Cited

U.S. PATENT DOCUMENTS

| | | |
|---|---|---|
| 400,997 A | 4/1889 | Berrie |
| 1,878,688 A | 9/1932 | Crosby |
| 2,057,171 A | 10/1936 | Van Der Pyl |
| 2,240,240 A | 4/1941 | Brockman |
| 2,477,960 A | 8/1949 | Caldwell |
| 2,503,174 A | 4/1950 | Salvadore |
| D165,926 S | 2/1952 | Moor, Jr. |
| 2,653,358 A | 9/1953 | Macdonald |
| 2,701,890 A | 2/1955 | Moor, Jr. |
| 2,810,672 A | 10/1957 | Taylor |
| 3,046,852 A | 7/1962 | Graham |
| 3,083,393 A | 4/1963 | Nappi |
| 3,236,018 A | 2/1966 | Graham et al. |
| 3,334,456 A | 8/1967 | Naka |
| 3,383,822 A | 5/1968 | Viehmann et al. |
| 3,396,501 A | 8/1968 | Tate |
| 3,470,663 A | 10/1969 | Tate |
| 3,555,762 A | 1/1971 | Costanzo, Jr. |
| 3,605,166 A | 9/1971 | Chen |
| 3,722,955 A | 3/1973 | Trotman |
| 3,783,471 A | 1/1974 | McGeary et al. |
| 3,808,628 A | 5/1974 | Betts |
| 3,886,706 A * | 6/1975 | Baker .................... E04C 2/384 52/474 |
| 3,921,350 A | 11/1975 | Van Schoyck |
| 3,938,295 A | 2/1976 | Tate |
| 4,018,025 A | 4/1977 | Collette |
| 4,029,834 A | 6/1977 | Bartlett |
| 4,109,439 A | 8/1978 | Feasel |
| 4,167,599 A | 9/1979 | Nissinen |
| 4,203,268 A | 5/1980 | Gladden, Jr. et al. |
| 4,276,728 A | 7/1981 | Balzer et al. |
| 4,282,695 A | 8/1981 | Lew |
| 4,285,075 A | 8/1981 | Nelson |
| 4,287,693 A | 9/1981 | Collette |
| 4,319,520 A | 3/1982 | Lanting et al. |
| 4,348,840 A | 9/1982 | Strader et al. |
| 4,381,324 A | 4/1983 | Ellingson, Jr. |
| 4,415,620 A | 11/1983 | Yamazaki et al. |
| 4,420,850 A * | 12/1983 | Moore .................... A47K 7/04 15/21.1 |
| 4,453,365 A | 6/1984 | Gladden |
| 4,478,901 A | 10/1984 | Dickens et al. |
| 4,561,232 A | 12/1985 | Gladden, Jr. et al. |
| RE32,061 E | 1/1986 | Ellingson, Jr. |
| 4,564,546 A | 1/1986 | Jones |
| 4,568,587 A | 2/1986 | Balzer |
| 4,584,221 A | 4/1986 | Kung |
| 4,590,110 A | 5/1986 | Arens |
| 4,596,729 A | 6/1986 | Morrison |
| D286,575 S | 11/1986 | Saunders |
| 4,654,245 A | 3/1987 | Balzer et al. |
| 4,663,903 A | 5/1987 | Ellingson, Jr. |
| 4,675,222 A | 6/1987 | Berndt, Jr. |
| 4,766,020 A | 8/1988 | Ellingson, Jr. |
| 4,804,570 A | 2/1989 | Bedics |
| 4,835,924 A | 6/1989 | Blacklin et al. |
| 4,845,907 A | 7/1989 | Meek |
| 4,877,672 A | 10/1989 | Shreiner |
| 4,879,151 A | 11/1989 | Ellingson, Jr. |
| 4,952,434 A | 8/1990 | Rumsey et al. |
| 4,968,170 A | 11/1990 | Wilson et al. |
| 4,999,964 A | 3/1991 | Taylor |
| 5,054,253 A | 10/1991 | Bedics |
| 5,088,251 A | 2/1992 | Hazeldine |
| 5,103,608 A | 4/1992 | Andreo |
| 5,142,733 A | 9/1992 | Mogel et al. |
| 5,157,804 A | 10/1992 | Williams |
| 5,190,799 A | 3/1993 | Ellingson, III |
| 5,195,292 A | 3/1993 | Bedics |
| D337,398 S | 7/1993 | Axelrod |
| D343,260 S | 1/1994 | Kovatch |
| 5,275,502 A | 1/1994 | Glaza et al. |
| 5,323,575 A * | 6/1994 | Yeh ..................... E04F 21/1844 52/177 |
| 5,364,204 A | 11/1994 | Macleod |
| 5,400,559 A | 3/1995 | Nicholas |
| 5,474,831 A | 12/1995 | Nystrom |
| 5,486,392 A | 1/1996 | Green |
| 5,499,888 A | 3/1996 | Hawkes |
| 5,509,244 A | 4/1996 | Bentzon |
| 5,513,472 A | 5/1996 | Olsen et al. |
| D374,728 S | 10/1996 | Bielert |
| 5,587,218 A | 12/1996 | Betz |
| 5,687,534 A | 11/1997 | Kongsgaard et al. |
| 5,695,842 A | 12/1997 | Peck, Jr. |
| D394,319 S | 5/1998 | Berger |
| 5,778,609 A | 7/1998 | Pawson et al. |
| 5,815,995 A | 10/1998 | Adam |
| D405,200 S | 2/1999 | Hines |
| 5,881,508 A | 3/1999 | Irvine et al. |
| D415,581 S | 10/1999 | Bertolini |
| 6,101,768 A | 8/2000 | Springstead et al. |
| 6,102,073 A | 8/2000 | Williams |
| D433,165 S | 10/2000 | Moreau et al. |
| 6,256,952 B1 * | 7/2001 | Fahy, Jr. ............... E04B 9/02 52/126.6 |
| 6,352,757 B1 | 3/2002 | Kessler et al. |
| 6,434,779 B1 | 8/2002 | Bartlett et al. |
| 6,539,681 B1 | 4/2003 | Siegmund |
| D477,883 S | 7/2003 | Smith et al. |
| D479,936 S | 9/2003 | Nurmentaus |
| 6,635,331 B2 | 10/2003 | Kessler |
| D483,977 S | 12/2003 | Nurmentaus |
| 6,659,097 B1 * | 12/2003 | Houston .................... B44D 3/12 125/12 |
| 6,663,937 B2 | 12/2003 | Ullman et al. |
| 6,695,527 B2 | 2/2004 | Seaux et al. |
| 6,740,380 B2 | 5/2004 | Kessler |
| 6,884,489 B2 | 4/2005 | Kessler |
| 6,941,703 B2 | 9/2005 | Maclean et al. |
| 6,966,155 B2 | 11/2005 | Nevison |
| 7,021,304 B1 * | 4/2006 | Houston .................... B44D 3/12 125/12 |
| 7,108,902 B2 | 9/2006 | Ellingson |
| 7,175,899 B2 | 2/2007 | Kessler |
| 7,210,876 B2 | 5/2007 | Moralez et al. |
| 7,244,076 B2 | 7/2007 | Whitson |
| 7,287,356 B2 | 10/2007 | Sacks et al. |
| 7,303,801 B2 | 12/2007 | Kessler |
| 7,344,334 B2 | 3/2008 | Thorkelson |
| 7,444,784 B2 | 11/2008 | Brown |
| D596,320 S | 7/2009 | Cantley |
| D616,571 S | 5/2010 | Gard et al. |
| D616,572 S | 5/2010 | Gard et al. |
| D616,573 S | 5/2010 | Gard et al. |
| D619,272 S | 7/2010 | Gard et al. |
| D620,151 S | 7/2010 | Gard et al. |
| 7,832,044 B2 | 11/2010 | Kessler et al. |
| 7,846,524 B2 | 12/2010 | Baglietto |
| 8,291,670 B2 | 10/2012 | Gard et al. |
| 8,397,466 B2 | 3/2013 | Jenkins et al. |
| 8,409,688 B2 | 4/2013 | Afolabi |
| 8,414,217 B2 | 4/2013 | Rosan |
| 8,427,034 B2 * | 4/2013 | King .................... E04F 15/02 310/339 |
| 8,601,767 B2 | 12/2013 | Gard et al. |
| 2001/0047251 A1 * | 11/2001 | Kemp .................... G06F 17/5004 703/1 |

(56) References Cited

U.S. PATENT DOCUMENTS

| | | | |
|---|---|---|---|
| 2002/0139070 A1 | 10/2002 | Berndt, Jr. | |
| 2004/0019994 A1* | 2/2004 | Kessler | A01K 1/0157 |
| | | | 15/215 |
| 2004/0109977 A1 | 6/2004 | Wildstein et al. | |
| 2005/0115181 A1 | 6/2005 | Grau | |
| 2005/0170139 A1 | 8/2005 | Kessler | |
| 2006/0070314 A1 | 4/2006 | Jenkins et al. | |
| 2006/0260223 A1 | 11/2006 | Wang | |
| 2007/0042159 A1 | 2/2007 | Sugihara et al. | |
| 2007/0193133 A1 | 8/2007 | Krupnick | |
| 2008/0024292 A1* | 1/2008 | Rosi | A62B 3/00 |
| | | | 340/525 |
| 2008/0104923 A1 | 5/2008 | Boxhorn et al. | |
| 2008/0118703 A1 | 5/2008 | Sansano | |
| 2008/0134593 A1 | 6/2008 | Moller | |
| 2008/0166521 A1* | 7/2008 | Kessler | A47L 23/266 |
| | | | 428/137 |
| 2008/0287221 A1 | 11/2008 | Babinsky et al. | |
| 2009/0217614 A1* | 9/2009 | Cooper | E04F 15/10 |
| | | | 52/582.1 |
| 2009/0304985 A1 | 12/2009 | Yuan et al. | |
| 2010/0272944 A1 | 10/2010 | Engelhardt | |
| 2010/0275535 A1 | 11/2010 | Gard et al. | |
| 2010/0281789 A1* | 11/2010 | Vac | E04F 15/02458 |
| | | | 52/126.5 |
| 2010/0300023 A1* | 12/2010 | Rosan | E04F 15/105 |
| | | | 52/302.1 |
| 2011/0047898 A1* | 3/2011 | Hudgins | E04B 1/04 |
| | | | 52/169.9 |
| 2011/0056158 A1* | 3/2011 | Moller, Jr. | E01O 5/20 |
| | | | 52/403.1 |
| 2011/0229692 A1 | 9/2011 | Bozouklian et al. | |
| 2011/0310595 A1 | 12/2011 | Hardesty | |
| 2012/0317913 A1* | 12/2012 | Esquivel | B28D 1/18 |
| | | | 52/311.2 |
| 2013/0167458 A1 | 7/2013 | Cerny et al. | |

FOREIGN PATENT DOCUMENTS

| | | |
|---|---|---|
| FR | 1082467 A | 12/1954 |
| GB | 2076868 | 12/1981 |
| WO | WO 2007/100533 A2 | 9/2007 |

OTHER PUBLICATIONS

U.S. Appl. No. 13/611,305 (U.S. Pat. No. 8,601,767), filed Sep. 12, 2012 (Dec. 10, 2013).

U.S. Appl. No. 14/063,849 (U.S. Pat. No. 9,340,983), filed Oct. 25, 2013 (May 17, 2016).

U.S. Appl. No. 14/082,957 (U.S. Pat. No. 8,997,432), filed Nov. 18, 2013 (Apr. 7, 2015).

U.S. Appl. No. 29/336,215 (U.S. Pat. No. D. 616,571), filed Apr. 29, 2009 (May 25, 2010).

U.S. Appl. No. 29/336,217 (U.S. Pat. No. D. 619,272), filed Apr. 29, 2009 (Jul. 6, 2010).

U.S. Appl. No. 29/336,222 (U.S. Pat. No. D. 620,151), filed Apr. 29, 2009 (Jul. 20, 2010).

U.S. Appl. No. 29/336,224 (U.S. Pat. No. D. 616,572), filed Apr. 29, 2009 (May 25, 2010).

U.S. Appl. No. 29/336,229 (U.S. Pat. No. D. 616,573), filed Apr. 29, 2009 (May 25, 2010).

U.S. Appl. No. 29/480,645 (U.S. Pat. No. D. 744,119), filed Jan. 28, 2014 (Nov. 24, 2015).

U.S. Appl. No. 12/432,587, Sep. 20, 2012 Response to Amendment under Rule 312.

U.S. Appl. No. 12/432,587, Sep. 12, 2012 Amendment after Notice of Allowance and Issue Fee payment.

U.S. Appl. No. 12/432,587, Jun. 20, 2012 Notice of Allowance.

U.S. Appl. No. 12/432,587, May 7, 2012 Amendment and Request for Continued Examination (RCE).

U.S. Appl. No. 12/432,587, Jan. 5, 2012 Final Office Action.

U.S. Appl. No. 12/432,587, Aug. 18, 2011 Response to Non-Final Office Action.

U.S. Appl. No. 12/432,587, Apr. 18, 2011 Non-Final Office Action.

U.S. Appl. No. 13/611,305, Oct. 17, 2013 Corrected Notice of Allowability.

U.S. Appl. No. 13/611,305, Sep. 30, 2013 Issue Fee payment.

U.S. Appl. No. 13/611,305, Jun. 28, 2013 Notice of Allowance.

U.S. Appl. No. 13/611,305, Jun. 11, 2013 Response to Final Office Action, Terminal Disclaimer filed and approved.

U.S. Appl. No. 13/611,305, Apr. 15, 2013 Final Office Action.

U.S. Appl. No. 13/611,305, Jan. 11, 2013 Response to Non-Final Office Action.

U.S. Appl. No. 13/611,305, Oct. 10, 2012 Non-Final Office Action.

U.S. Appl. No. 14/063,849, Apr. 11, 2016 Issue Fee Payment.

U.S. Appl. No. 14/063,849, Jan. 11, 2016 Notice of Allowance.

U.S. Appl. No. 14/063,849, Nov. 30, 2015 Response to Non-Final Office Action.

U.S. Appl. No. 14/063,849, Sep. 1, 2015 Non-Final Office Action.

U.S. Appl. No. 14/063,849, Jul. 14, 2015 Response to Restriction Requirement.

U.S. Appl. No. 14/063,849, May 14, 2015 Restriction Requirement Filed.

U.S. Appl. No. 14/082,957, Jan. 8, 2015 Response to Non-Final Office Action.

U.S. Appl. No. 14/082,957, Jan. 28, 2015 Notice of Allowance.

U.S. Appl. No. 14/082,957, Mar. 3, 2015 Issue Fee Payment.

U.S. Appl. No. 14/082,957, Oct. 8, 2014 Non Final Office Action.

U.S. Appl. No. 29/336,215, Apr. 12, 2010 Amendment after Notice of Allowance and Issue Fee payment.

U.S. Appl. No. 29/336,215, Jan. 12, 2010 Notice of Allowance.

U.S. Appl. No. 29/336,217, Apr. 13, 2010 Amendment after Notice of Allowance and Issue Fee payment.

U.S. Appl. No. 29/336,217, Jan. 13, 2010 Issue Fee payment.

U.S. Appl. No. 29/336,222, Jun. 15, 2010 Issue Fee payment.

U.S. Appl. No. 29/336,222, May 6, 2010 Notice of Allowance.

U.S. Appl. No. 29/336,222, Apr. 12, 2010 Response to Non-Final Office Action.

U.S. Appl. No. 29/336,222, Dec. 31, 2009 Non-Final Office Action.

U.S. Appl. No. 29/336,224, Apr. 12, 2010 Amendment after Notice of Allowance and Issue Fee payment.

U.S. Appl. No. 29/336,224, Jan. 13, 2010 Notice of Allowance.

U.S. Appl. No. 29/336,229, Apr. 12, 2010 Issue Fee payment.

U.S. Appl. No. 29/336,229, Jan. 12, 2010 Notice of Allowance.

U.S. Appl. No. 29/480,645, Oct. 19, 2015 Issue Fee Payment.

U.S. Appl. No. 29/480,645, Jul. 20, 2015 Notice of Allowance.

International Search Report for PCT/US2010/026782, dated May 11, 2010.

International Search Report dated Mar. 3, 2015 in International Application No. PCT/US 14/60819.

Supplementary European Search Report dated Jun. 22, 2017 in Application No. EP 14856094.

* cited by examiner

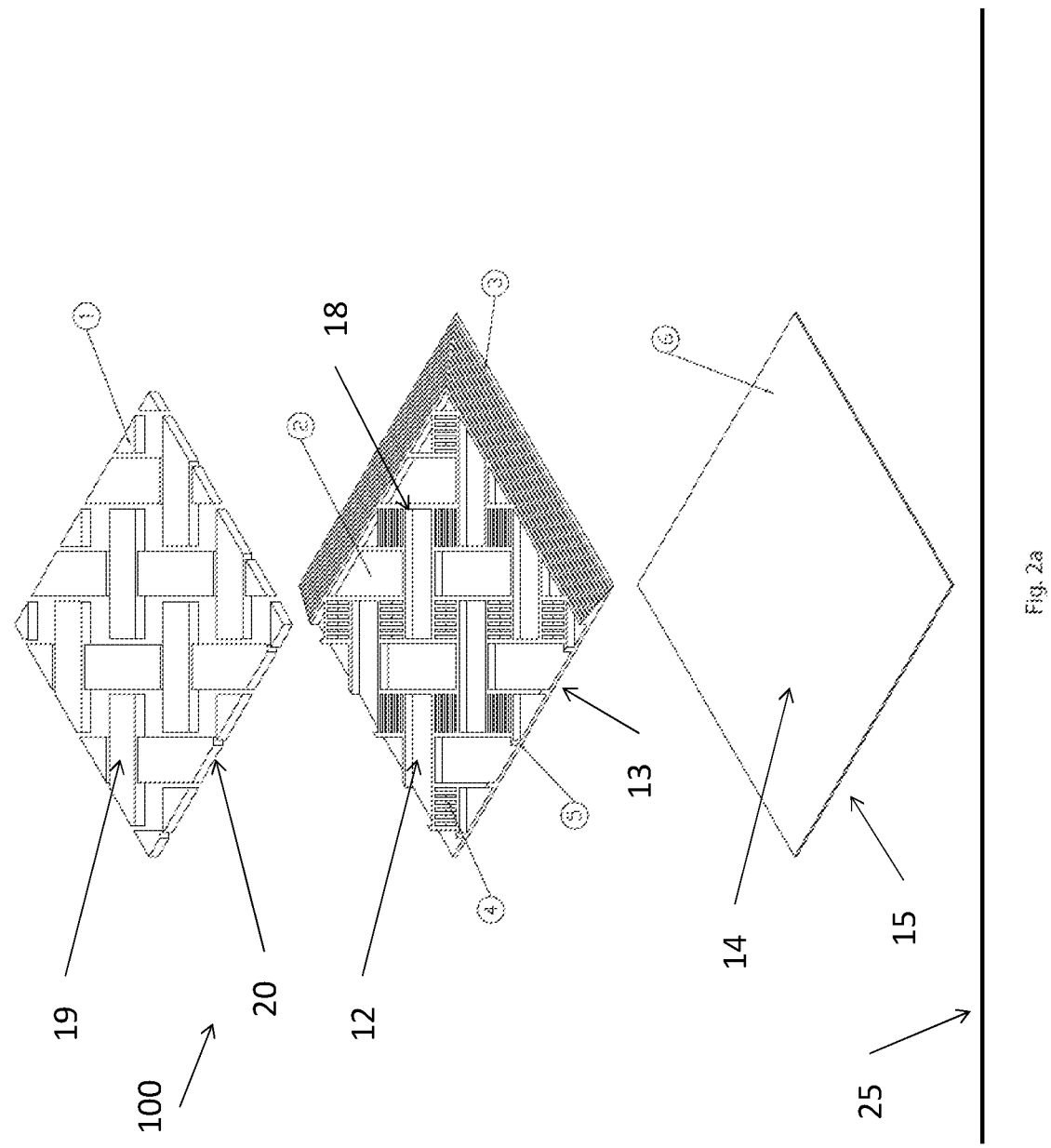

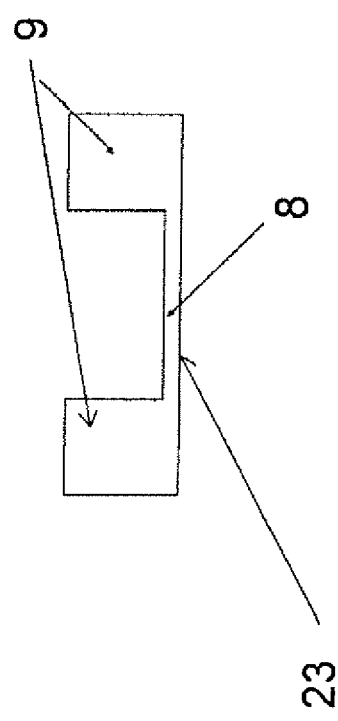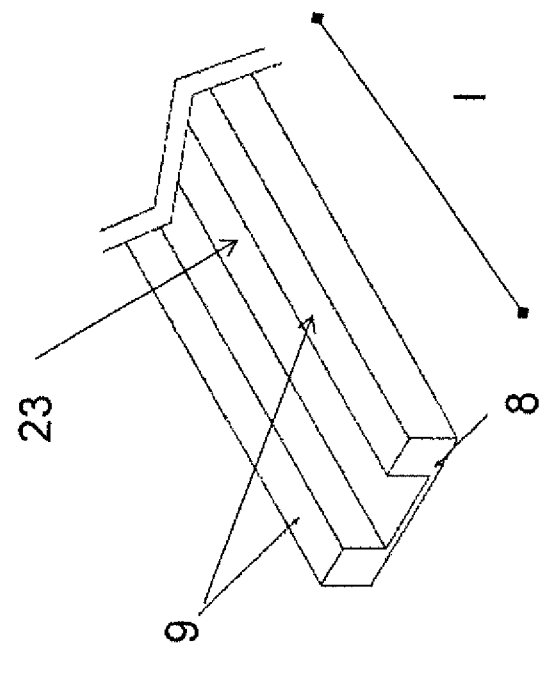

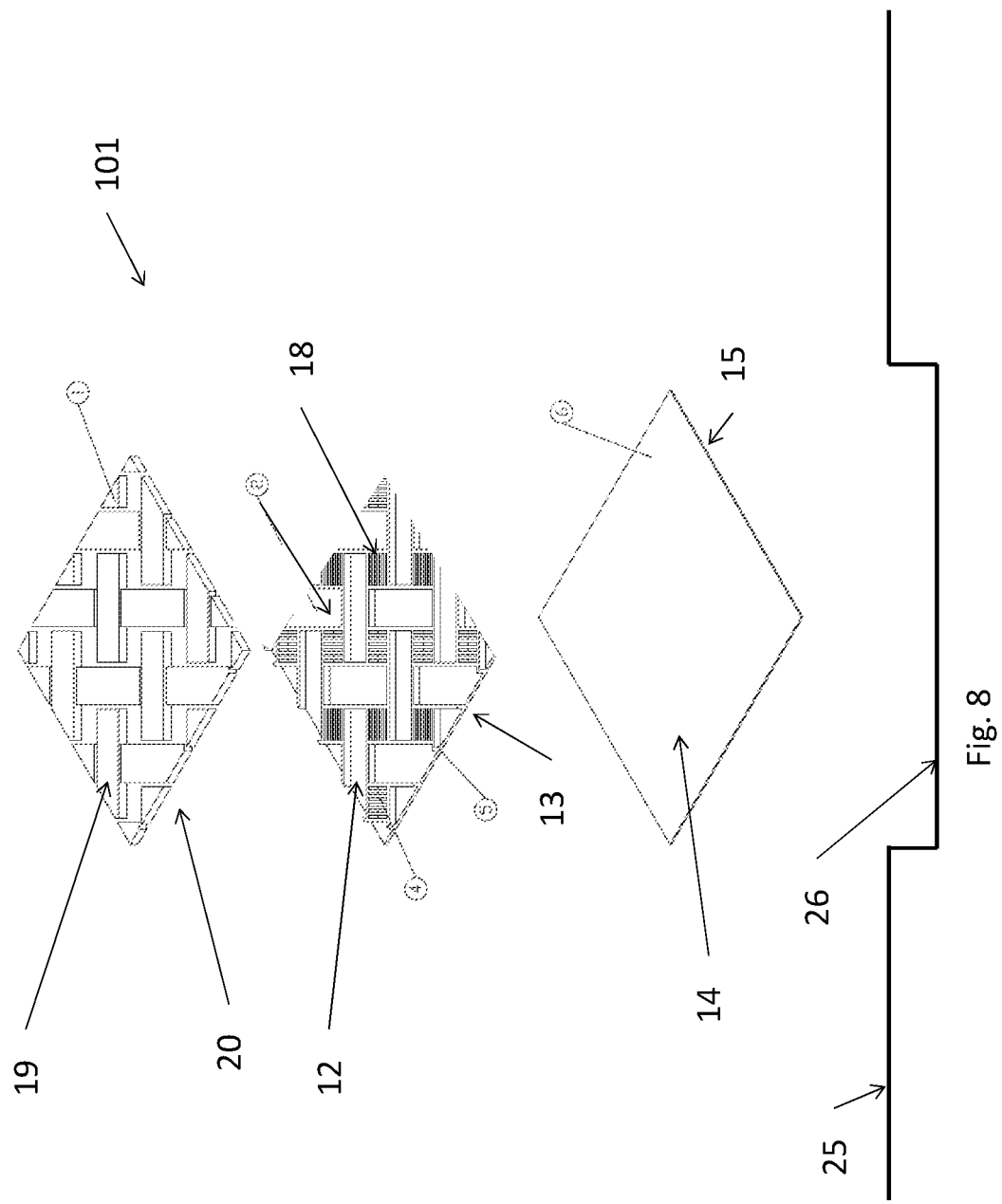

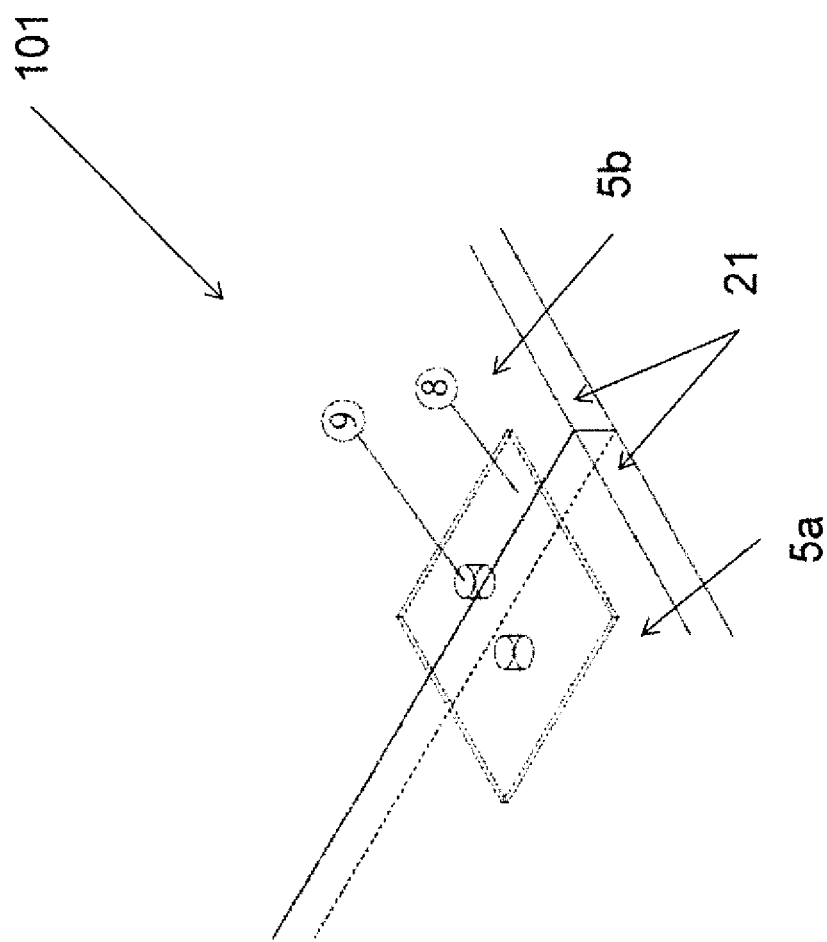

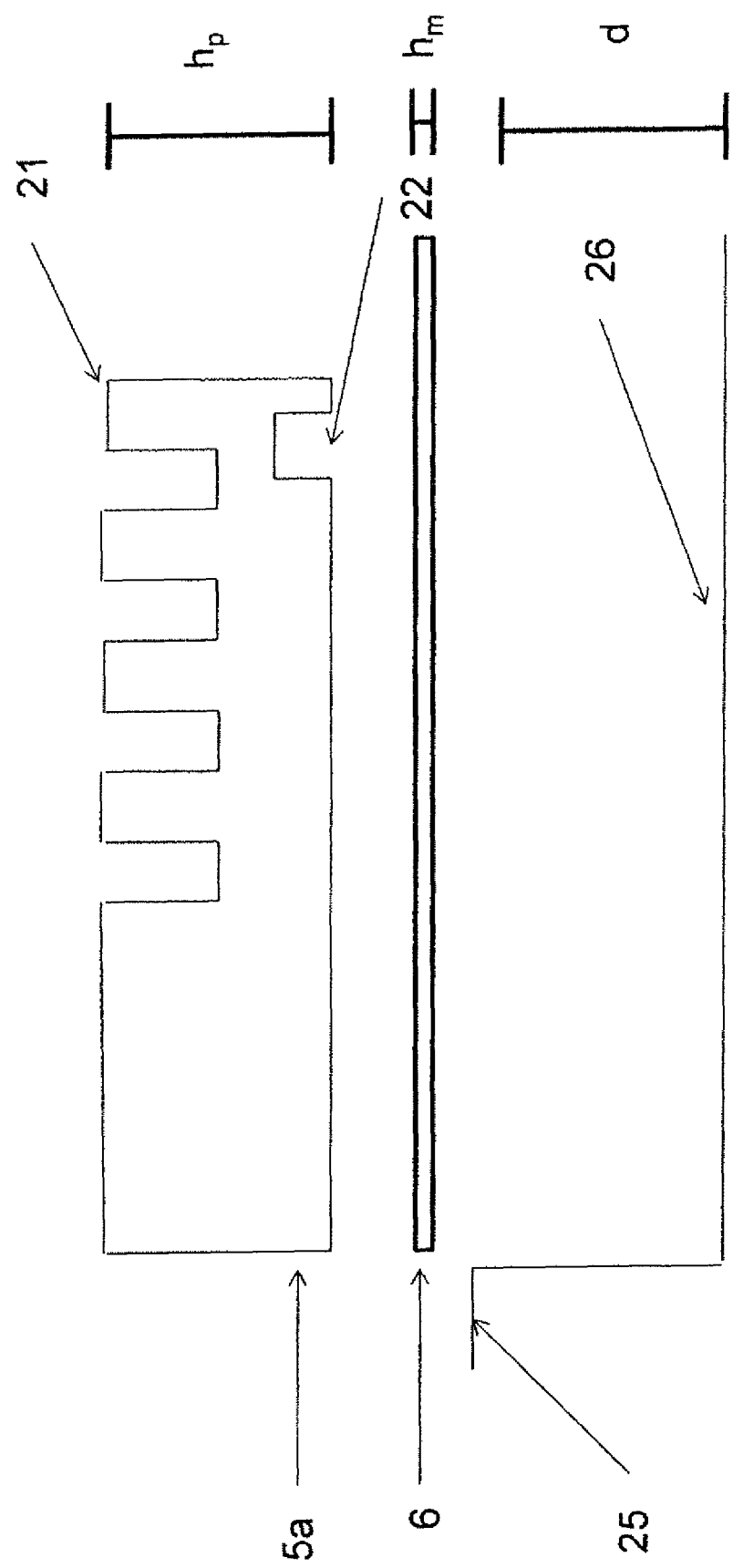

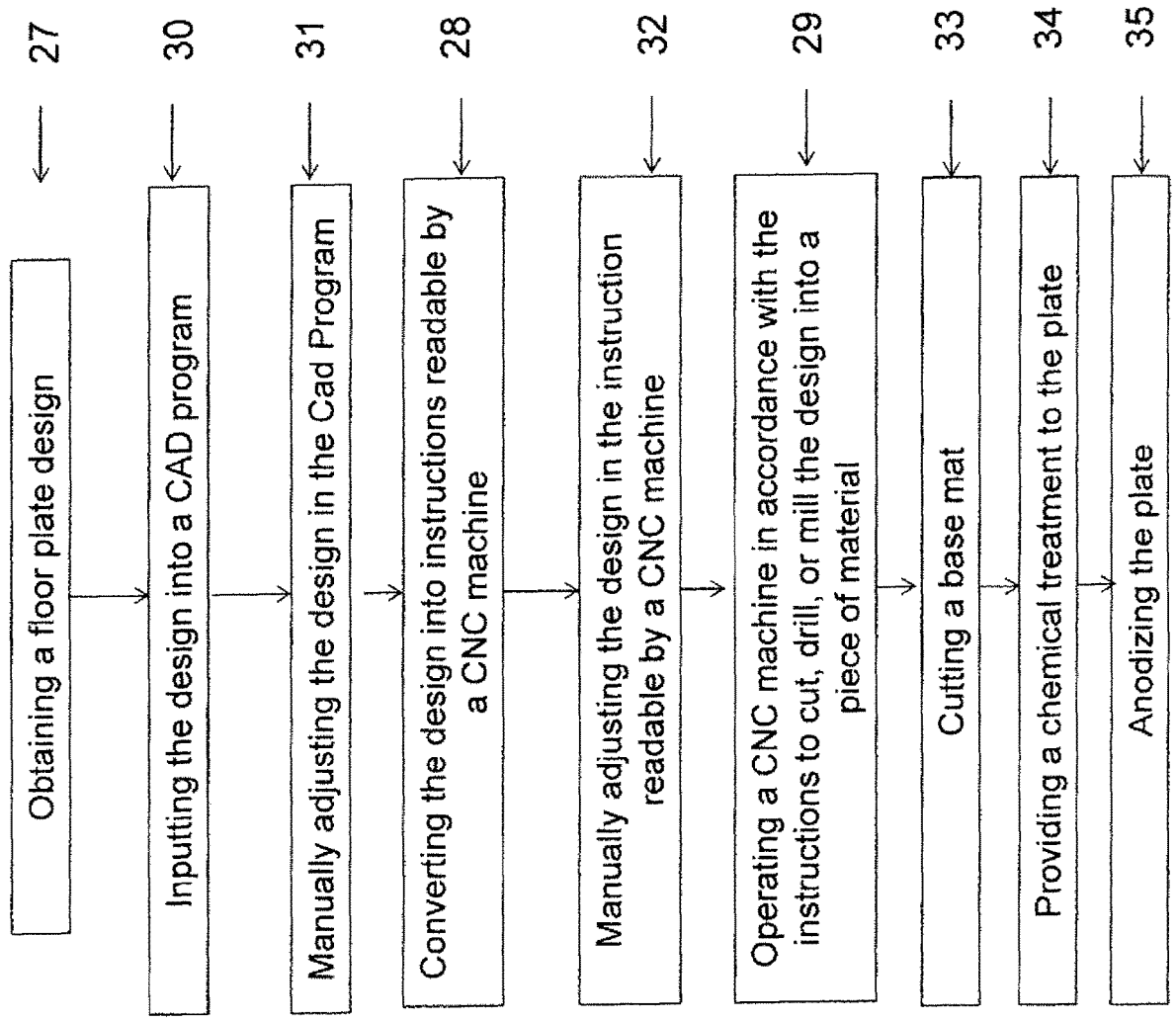

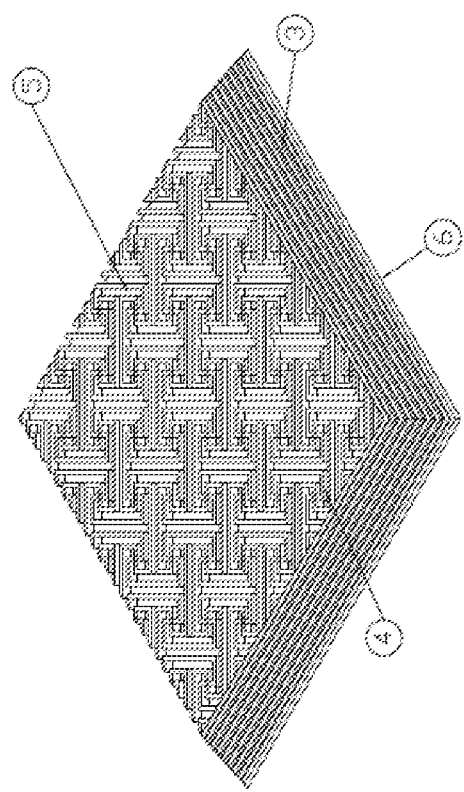
Fig. 14a
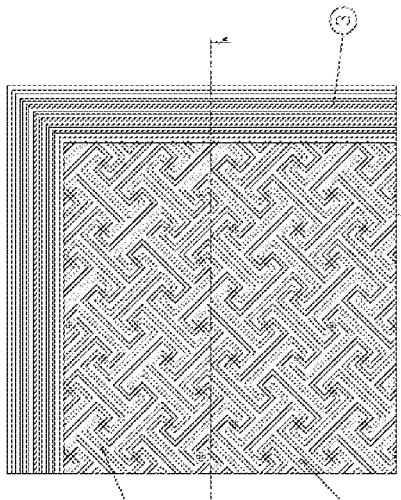
Fig. 14b
Fig. 14c

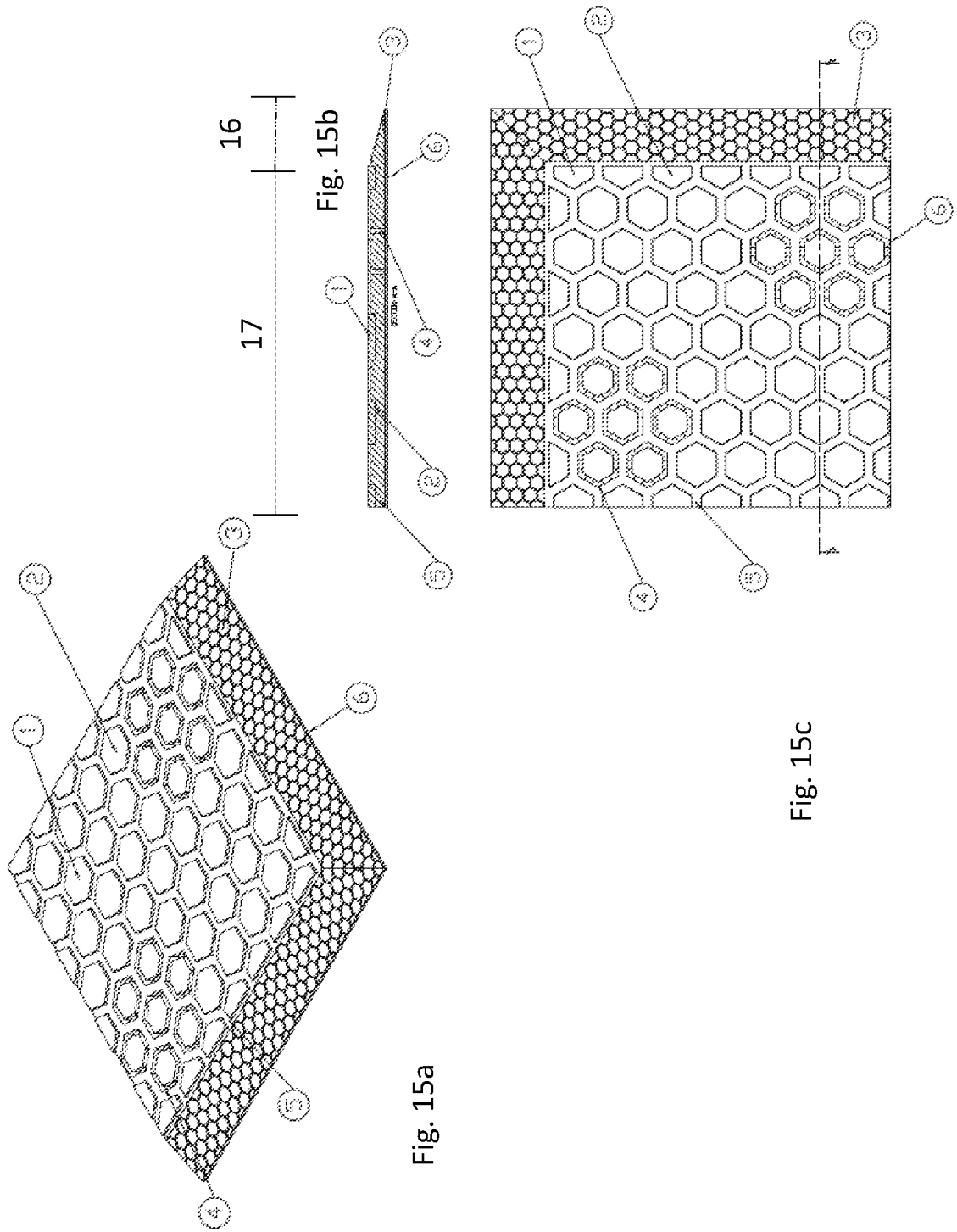

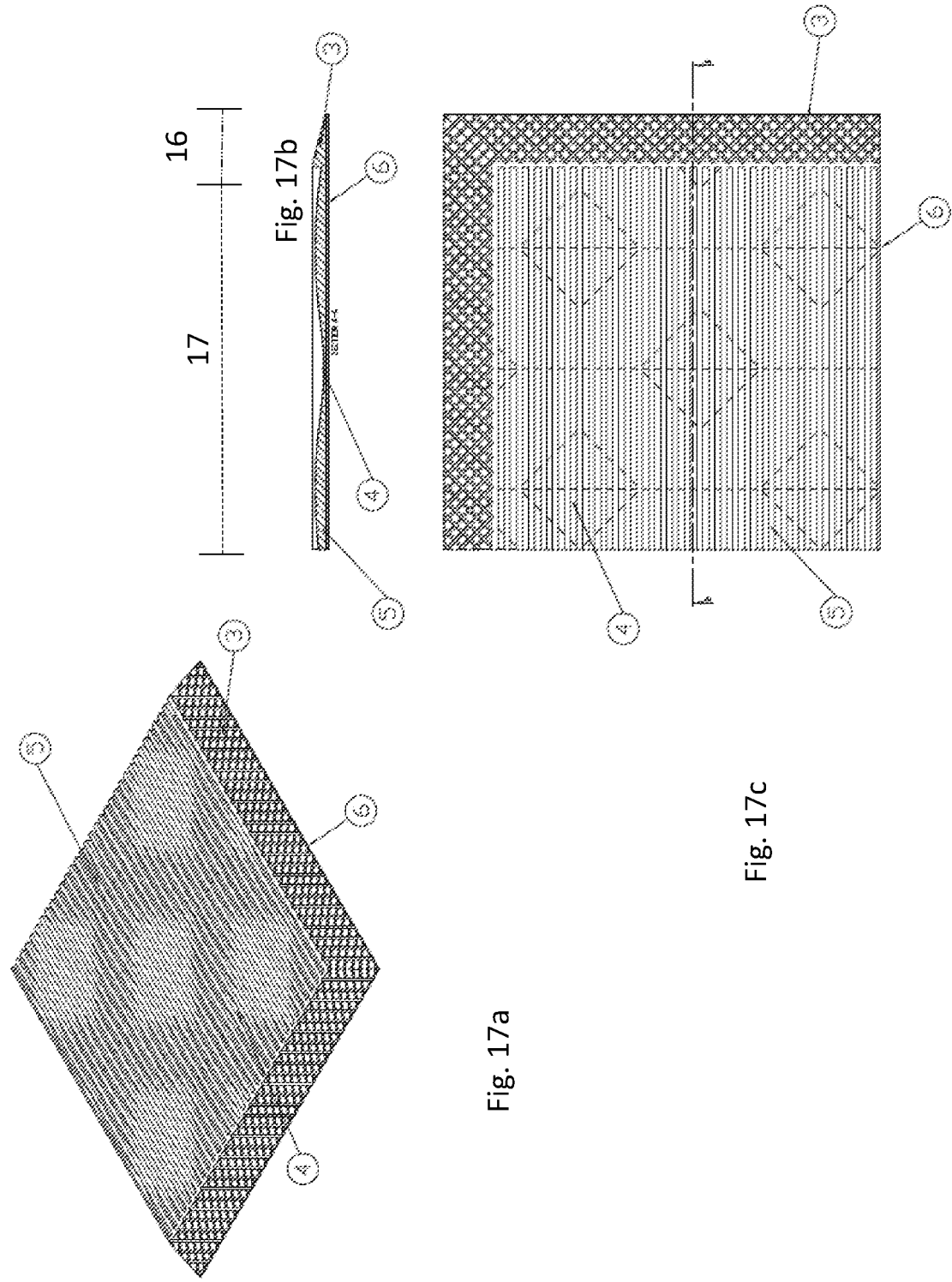

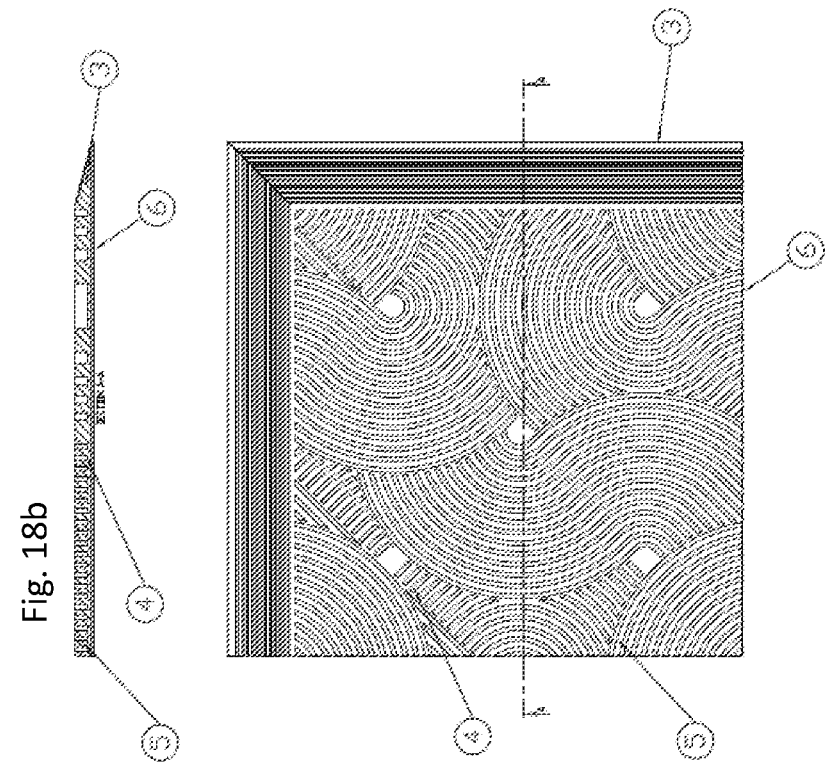
Fig. 18b
Fig. 18c
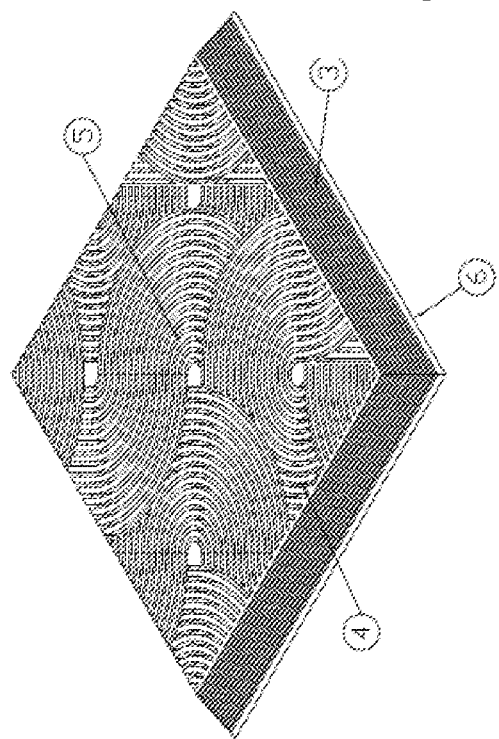
Fig. 18a

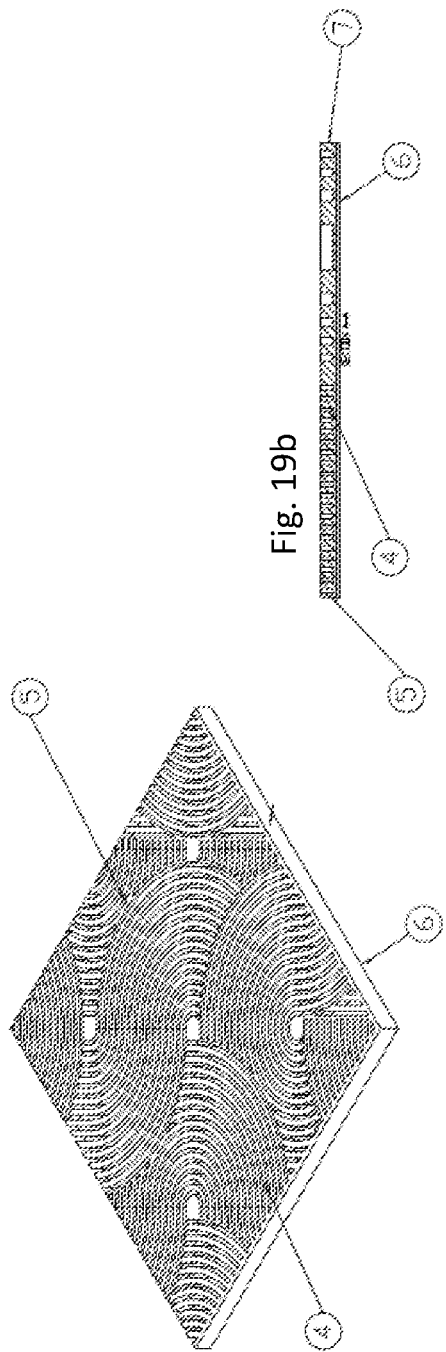
Fig. 19a
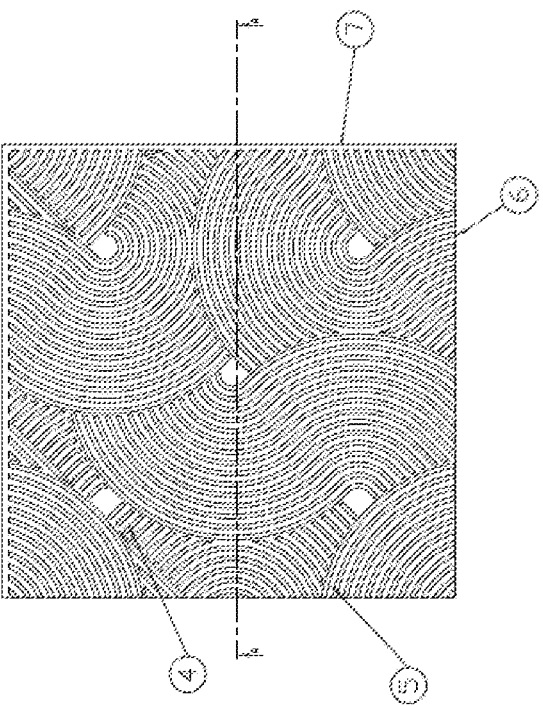
Fig. 19b
Fig. 19c

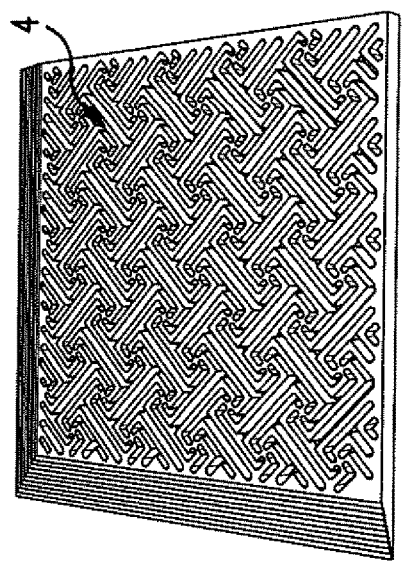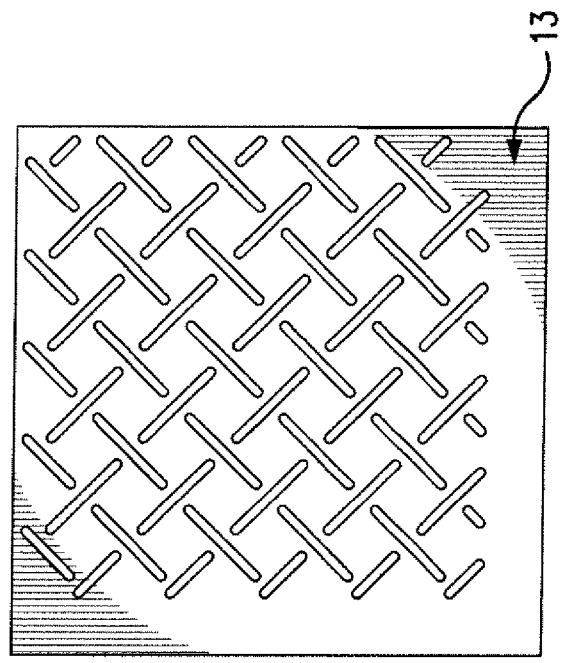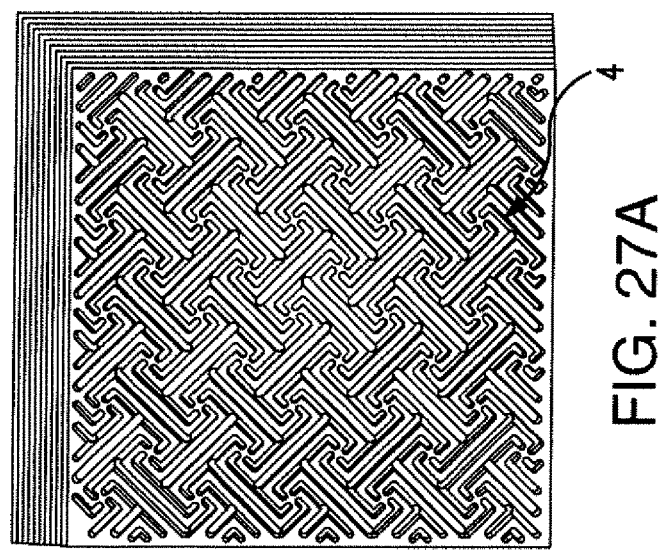

ENTRANCE FLOOR SYSTEM

CROSS-REFERENCE TO RELATED APPLICATIONS

This application is a continuation of U.S. patent application Ser. No. 14/063,849, filed Oct. 25, 2013, which is incorporated by reference herein in its entirety

BACKGROUND OF THE INVENTION

1. Field of the Invention

The disclosed subject matter relates to an entrance floor system for use in residential or commercial establishments. Particularly, the present disclosed subject matter is directed to an entrance floor system including a plate with a pattern machined therein.

2. Description of Related Art

A variety of flooring designs and construction methods are known for entrance ways to office buildings, stores, residences and the like which are frequently provided with gratings which are recessed into the foundation so as to be flush with the floor surface. These gratings are designed to facilitate the removal of debris, such as dirt, snow, water and the like from footwear of pedestrian traffic entering the structure.

Typical forms of such entrance gratings include a plurality of elongated rigid rails arranged in side-by-side, parallel relationship. These rails are generally rectangular and sized to extend large distances, and in some embodiments, over the entire entrance floor area such that a single grate can span the entire entrance floor area. The size and weight of such large gratings can present numerous problems with respect to installation and maintenance, as handling of such cumbersome gratings can prove hazardous and require assistance by numerous service personnel. An example of such prior art designs is disclosed in U.S. Pat. No. 5,054,253, which is hereby incorporated by reference in its entirety.

Alternative prior art floor structures are configured as a roll-up design in which rails are joined or interconnected to adjacent rails by a flexible hinge member. Similar to the prior art designs discussed above, these roll-up mats are typically elongated rigid rails arranged parallel to each other and extend over the entire entrance floor area. Consequently, these roll-up designs are prone to similar installation and maintenance problems. Furthermore, these mats are restricted to a predominantly linear appearance. An example of such a roll-up floor mat is disclosed in U.S. Pat. Nos. 4,029,834 and 4,877,672 which are hereby incorporated by reference, in their entireties.

Floor mats are also known which are directly supported by a floor surface and may either be placed directly thereon or in a slight recess. While floor mats are typically made of lighter materials and may be of a smaller size than the metal gratings discussed above, such floor mats require more frequent cleaning than the previously described grill and grating systems because less space is provided for the accumulation of foreign material. The capacity of such a floor mat to accumulate foreign material is generally limited by the amounts which may be retained in the tread material. As these spaces fill with dirt or become saturated with water, the floor mat tends to lose its ability to clean the footwear of pedestrians passing across the base mat. Also, the tread surfaces of such floor mats are generally not replaceable and lack the strength and durability of rigid rails.

Modular entrance floor systems are also known which allow for the replacement and installation of individual floor modules. An example of such a modular entrance floor system is disclosed in U.S. Pat. No. 8,291,670, which is hereby incorporated by reference in its entirety.

There remains a need for a light weight entrance floor system which can be custom designed to a particular appearance, size and/or shape which allows for easy installation and removal. Further, an entrance floor system which allows for a variety of surface floor features and aesthetics is desired to provide greater flexibility and customization for a variety of architectures and entrance appearances.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, one embodiment of the disclosed subject matter provides an entrance floor including a base mat and a plate. The base mat has opposing bottom and top surfaces. The bottom surface of the base mat is configured to rest on a floor surface. The plate has opposing bottom and top surfaces. The bottom surface of the plate is configured to rest on the top surface of the base mat. The top surface of the plate has a border region and a non-border region. The non-border region is substantially parallel with the bottom surface of the plate and the non-border region has a pattern machined therein. The pattern includes a plurality of slots. At least one slot is configured to receive fluid and debris. The top surface of the plate in the border region includes a transition from the floor surface to the non-border region of the top surface of the plate.

In some embodiments, the non-border region can further include an upper surface area and a recessed area. The recessed area is at a depth below the upper surface area. At least a portion of the recessed area can be configured to receive fluid and debris. In some embodiments, the entrance floor system can include at least one insert. The inserts each have a bottom and top and the bottom can be attached to at least a portion of the recessed area. The bottom of the insert can be attached to at least a portion of the recessed area such that the top of the insert is higher than the upper surface area. Alternatively, the bottom of the insert can be attached to at least a portion of the recessed area such that the top of the insert is flush with the upper surface area. The insert can be made of carpet, recycled rubber, abrasive tape, abrasive strips, or combinations thereof. In some embodiments, the slots have a slot depth and the pattern is machined so that the slot depth varies along a length of the plate. In some embodiments, one or more of the slots can extend between the bottom and top surfaces of the plate to allow water or debris to move from the top surface of the plate to the top surface of the base mat. The plate can be machined by a computer numeric control (CNC) machine. In some embodiments, the slots form a pattern having a plurality of diamonds, and the at least one insert can form a weave pattern around the diamonds.

The plate can be made of aluminum. Optionally, the plate can be abrasive blasted thereby providing an increased coefficient of friction. The plate can be anodized. In some embodiments, the plate can be a monolithic piece. The base mat can be made of rubber, recycled rubber, neoprene, or combinations thereof. In some embodiments, the transition can be a step transition.

In some embodiments, the entrance floor system can include a plurality of plates, each plate having opposing bottom and top surfaces. The bottom plate surfaces can be configured to rest on the top surface of the base mat. The top surfaces of the plates each can have a border region and a non-border region. The non-border regions can be substantially parallel with the bottom surfaces of the plates and the non-border regions can have a pattern machined therein. The pattern can include a plurality of slots. At least one slot can be configured to receive fluid and debris. The top surfaces of the plates in the border regions can include a transition from the floor surface to the non-border regions of the top surfaces of the plates. The plates can also each have at least one interior side. Each interior side can have a length and can be configured to lay adjacent to an interior side of another of the plurality of plates. The interior sides are configured without a border region. The plates can also have at least one recess in the bottom surface of the plate proximate an interior side. The system can also include at least one connector plate. The connector plates can have a base and first and second pegs. The base is configured to rest on the top surface of the base mat. The first peg can be configured to engage a recess of one plate and the second peg can be configured to engage a recess of an adjacent plate. The pegs can be cylindrical. The connector plate can be a continuous extrusion and the base and first and second pegs can each have a length. The length of the base and first and second pegs can be equal. The first peg can be configured to engage a recess of a first plate. The first peg and the first plate can have substantially the same length. The second peg can be configured to engage a recess of an adjacent plate. The second peg and the adjacent plate can have substantially the same length.

In another embodiment of the disclosed subject matter, an entrance floor system is provided for placement in a floor recess. The floor recess has a depth. The entrance floor system has a base mat and a plate. The base mat has a height and opposing bottom and top surfaces. The bottom surface of the base mat is configured to rest within the floor recess. The plate has a height and opposing bottom and top surfaces. The bottom surface of the plate is configured to rest on the top surface of the base mat. The top surface of the plate is substantially parallel with the bottom surface of the plate and has a pattern machined therein. The pattern includes a plurality of slots. At least one slot is configured to receive fluid and debris. The entrance floor system has a total height including the plate height and the base mat height. The total height is substantially equal to the recess depth.

In some embodiments, the top surface of the plate further includes an upper surface area and a recessed area. The recessed area is a depth below the upper surface area. At least a portion of the recessed area can be configured to receive fluid and debris. In some embodiments, the slots have a slot depth and the pattern is machined so that the slot depth varies along a length of the plate. The plate can be machined by a computer numeric control (CNC) machine. In some embodiments, the entrance floor system can include at least one insert. The inserts each have a bottom and top and the bottom can be attached to at least a portion of the recessed area. The bottom of the insert can be attached to at least a portion of the recessed area such that the top of the insert is higher than the upper surface area. Alternatively, the bottom of the insert can be attached to at least a portion of the recessed area such that the top of the insert is flush with the upper surface area. The insert can be made of carpet, recycled rubber, abrasive tape, abrasive strips, or combinations thereof. The slots can form a pattern having a plurality of diamonds and the at least one insert can form a weave pattern around the diamonds. In some embodiments, one or more of the slots extend between the bottom and top surfaces of the plate to allow water or debris to move from the top surface of the plate to the top surface of the base mat.

The plate can be made of aluminum. The plate can be abrasive blasted thereby providing an increased coefficient of friction. The plate can be anodized. In some embodiments, the plate can be a monolithic piece. The base mat can be made of rubber, recycled rubber, neoprene, or combinations thereof.

In some embodiments, the entrance floor system includes a plurality of plates, each plate having a height and opposing bottom and top surfaces. The bottom plate surfaces can be configured to rest on the top surface of the base mat. The top surfaces of the plates can be substantially parallel with the bottom surfaces of the plates and the top surfaces of the plates can have a pattern machined therein. The pattern includes a plurality of slots. At least one slot can be configured to receive fluid and debris. The plates can also each have at least one interior side. Each interior side can have a length and can be configured to lay adjacent to an interior side of another of the plurality of plates. The plates can also have at least one recess in the bottom surface of the plate proximate an interior side. The system can also include at least one connector plate. The connector plates have a base and first and second pegs. The base is configured to rest on the top surface of the base mat. The first peg can be configured to engage a recess of one plate and the second peg can be configured to engage a recess of an adjacent plate. The pegs can be cylindrical. The connector plate can be a continuous extrusion and the base and first and second pegs can each have a length. The length of the base and first and second pegs can be equal. The first peg can be configured to engage a recess of a first plate. The first peg and the first plate can have substantially the same length. The second peg can be configured to engage a recess of an adjacent plate. The second peg and the adjacent plate can have substantially the same length.

In another embodiment of the disclosed subject matter, a method of preparing an entrance floor system is provided. The method includes obtaining a floor plate design, converting the design into instructions readable by a computer numerical control (CNC) machine, and operating a CNC machine in accordance with the instructions to cut, drill, or mill the design into a piece of material, thereby producing a plate. The plate has opposing bottom and top surfaces with a pattern including a plurality of slots machined in the top surface of the plate.

In some embodiments, the method further includes cutting a base mat to substantially similar dimensions as the plate. In some embodiments, the top surface of the plate has a border region and a non-border region. The non-border region can be substantially parallel with the bottom surface of the plate. The method can also include manually adjusting the design in the instructions readable by a CNC machine. The method can include inputting the design into a computer aided design (CAD) program. The method can further include manually adjusting the design in the CAD program. The method can include providing a chemical treatment to the plate. The method can include anodizing the plate.

In another embodiment of the disclosed subject matter, an entrance floor system is provided. The entrance floor system is prepared by a process including obtaining a floor plate design, converting the design into language readable by a CNC machine, and operating a CNC machine in accordance with the instructions to cut, drill, or mill the design into a piece of material, thereby producing a plate. The plate has opposing bottom and top surfaces with a pattern including a plurality of slots machined in the top surface of the plate.

In some embodiments, the entrance floor system can further include cutting a base mat to substantially similar dimensions as the plate. In some embodiments, the top surface of the plate has a border region and a non-border region. The non-border region can be substantially parallel with the bottom surface of the plate. The method can also include manually adjusting the design in the instructions readable by a CNC machine. The method can include the step of inputting the design into a computer aided design (CAD) program. The method can further include the step of manually adjusting the design in the CAD program. The method can include providing a chemical treatment to the plate. The method can include anodizing the plate.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

FIG. 2a is an exploded perspective view of the entrance floor system shown in FIG. 1.

FIGS. 6a-b are plain and perspective views, respectively, of an alternative connector plate in accordance with the disclosed subject matter.

FIG. 8 is an exploded perspective view of an embodiment of the entrance floor system in accordance with the disclosed subject matter.

FIG. 10 is a perspective view of a portion of an embodiment of the entrance floor system in accordance with the disclosed subject matter.

FIG. 11 is a cross-sectional view of an embodiment of the entrance floor system in accordance with the disclosed subject matter.

FIG. 13 is another embodiment of a method for preparing an entrance floor system in accordance with the disclosed subject matter.

FIGS. 14a-c are perspective, cross-sectional, and plain views, respectively, of a portion of an embodiment of the entrance floor system in accordance with the disclosed subject matter.

FIGS. 15a-c are perspective, cross-sectional, and plain views, respectively of a portion of an embodiment of the entrance floor system in accordance with the disclosed subject matter.

FIGS. 17a-c are perspective, cross-sectional, and plain views, respectively, of a portion of an embodiment of the entrance floor system in accordance with the disclosed subject matter.

FIGS. 18a-c are perspective, cross-sectional, and plain views, respectively, of a portion of an embodiment of the entrance floor system in accordance with the disclosed subject matter.

FIGS. 19a-c are perspective, cross-sectional, and plain views, respectively, of a portion of an embodiment of the entrance flooring system in accordance with the disclosed subject matter.

FIGS. 27a-c are photographs of a plate in accordance with one embodiment of the disclosed subject matter.

DETAILED DESCRIPTION OF THE DISCLOSED SUBJECT MATTER

Figure 1:
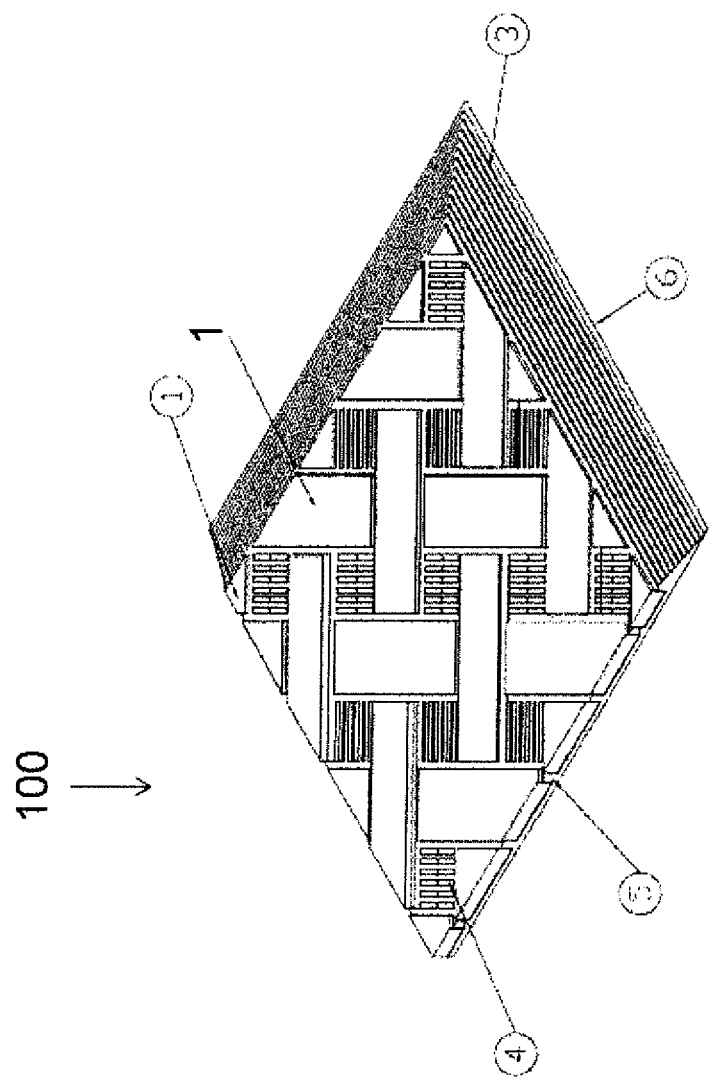
FIG. 1 is a perspective view of a portion of an embodiment of the entrance floor system in accordance with the disclosed subject matter.

Reference will now be made in detail to the exemplary embodiments of the disclosed subject matter, examples of which are illustrated in the accompanying drawings. The methods of the disclosed subject matter will be described in conjunction with the detailed description of the system. The methods and systems presented herein may be used for an entrance floor system. The disclosed subject matter is particularly suited for an entrance floor system having a variety of designs and aesthetic features which can provide for removal of dirt, water, debris, and other materials from footwear of pedestrian traffic entering a building.

The accompanying figures, where like reference numerals refer to identical or functionally similar elements throughout the separate views, serve to further illustrate various embodiments and to explain various principles and advantages all in accordance with the disclosed subject matter. For the purpose of explanation and illustration, and not limitation, an exemplary embodiment of the system in accordance with the disclosed subject matter is shown in FIGS. 1 and 2 and is designated generally by reference character 100.

Figures 2B, 2C:
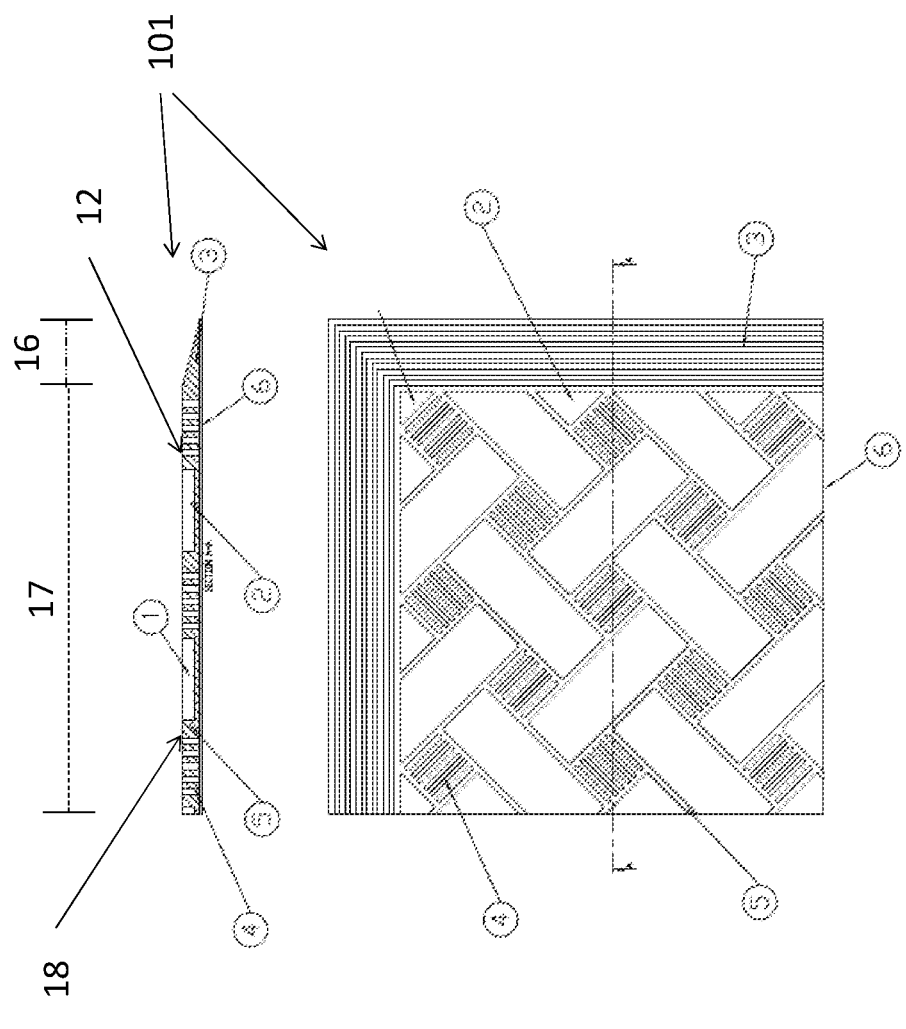
FIGS. 2b-c are cross-sectional and plain views, respectively, of the entrance floor system shown in FIG. 1.

For purposes of illustration and not limitation, FIG. 1 shows a perspective view of a portion of an entrance floor system 100 of the disclosed subject matter. FIG. 2a shows an exploded view of the entrance floor system 100 of FIG. 1. FIGS. 2b and 2c show cross-sectional and plain views, respectively, of the entrance floor system 100 of FIG. 1. The entrance floor system 100 includes a plate 5 and a base mat 6. The plate 5 and the base mat 6 can have substantially the same dimensions. As used herein, substantially the same dimensions means when placed on top of one another, the edges of plate 5 and base mat 6 will sit within 1 inch of one another, preferably within ½ inch, more preferably within ¼ inch, even more preferably within ⅛ inch and most preferably within 1/16 inch. However, the plate 5 and base mat 6 can also have different dimensions in some embodiments.

The base mat 6 has a top surface 14 and a bottom surface 15, which are opposite one another. The bottom surface 15 of the base mat 6 is configured to rest on any suitable floor surface 25 (shown in FIG. 2a) which includes, for example, a floor, a building foundation, or the ground. The floor surface is not limited to being indoors. The base mat 6 can preferably be made of a thin substrate, for example recycled rubber, neoprene, or other similar material that can have shock absorbency. The base mat can be functional to absorb shock of people or other objects moving about the top of the entrance floor system 100. In some embodiments, the base mat 6 can be composed of other materials which have limited or no shock absorbency. In other embodiments, the base mat 6 is optional.

The plate 5 has a top surface 12 and a bottom surface 13, which are opposite one another. The bottom surface 13 of the plate 5 is configured to rest on the top surface 14 of the base mat 6. The top surface 12 of the plate 5 has a border region 16 and a non-border region 17. The non-border region 17 of the top surface 12 of the plate 5 is substantially parallel with the bottom surface 13 of the plate 5. Also, the non-border region 17 of the top surface 12 of the plate 5 has a pattern machined therein. The pattern includes a plurality of slots 4. It will be appreciated that the term pattern, as used herein, can include a plurality of patterns that can, but do not have to be, related to one another and the subject matter herein is not limited to any particular pattern or configurations. The pattern can include an interior pattern and a separate border pattern. At least one of the slots 4 can be configured to receive water and debris. The slots 4 can also be functional to increase slip resistance. In some embodiments, the slots 4 will not extend between the top surface 12 of the plate 5 and the bottom surface 13 of the plate 5 (e.g., slots 4 shown in FIGS. 14b, 17b and 18b). In such embodiments, water and debris may collect in the slots 4. This can prevent dirt from getting under the plate 5 and therefore the plate 5 would not need to be lifted during cleaning; rather cleaning in this embodiment could performed from the surface of the plate 5. In some embodiments, the slots 4 can extend between top surface 12 of the plate 5 and the bottom surface 13 of the plate 5 (e.g., slots 4 shown in FIG. 2b). In such embodiments, water or debris can move from the top surface 12 of the plate 5 to the top surface 14 of the base mat 6. The plate 5 can be lifted and/or moved periodically for cleaning underneath. As used herein, the term slot is not limited to long thin openings, and is recognized to include any suitable shape including, but not limited to long and thin, round, oval, rectangular, triangular, and the like.

As shown in FIG. 2b, the non-border region 17 can include an upper surface area 18 and a recessed area 2. The recessed area 2 sits a depth below the upper surface area 18. The depth can vary depending on the purpose of the recessed area 2. For example, the depth can be about 40% to about 67% of the height of the plate if the recess receives an insert. Alternatively the depth can be about 17% to about 50% of the height of the plate if the recess is configured to receive water and debris. In alternate embodiments, other suitable depths can be used. At least a portion of the recessed area 2 can be configured to receive fluid and debris. The entrance floor system 100 can further include at least one insert 1. The inserts have a top 19 and a bottom 20. The bottom 20 is attached to at least a portion of the recessed area 2. The bottom 20 can be attached such that the top 19 of the insert 1 can sit higher than the upper surface area 18. This can increase traction, prevent slipping, and can also knock debris or water from shoes. The inserts 1 can be made from carpet, recycled rubber, abrasive tape, abrasive strips, combinations thereof or other suitable materials known to one of ordinary skill in the art. The inserts 1 can be adhered in place using standard or waterproof adhesives, hook and loop systems (e.g., Velcro), or other known means. In another embodiment, the top 19 of insert 1 can be configured to sit flush with, or lower than the upper surface area 18.

The border region 16 can provide a transition 3 from a floor surface 25, such as the floor, to the non-border region 17 of the top surface 12 of the plate 5. The transition 3 can be any suitable configuration, such as a stepped transition as shown in FIG. 1. The transition 3 can include a variety of surface textures, including saw-tooth, angled steps, inverted saw-tooth, and others. The transition 3 can alternatively be smooth or an inward or outward parabola transition. The transition 3 can also have a design machined therein (e.g., transition 3 in FIGS. 15a-c, 16 and 17a-c). In use, the transition 3 prevents tripping and allows wheels to roll from a surface, such as the floor, to the top surface 12 of the plate 5. In other embodiments, a border region without a transition can be used.

In one embodiment, the border region 16 is not a separate piece of material from the non-border region 17; rather the plate 5 can be one monolithic or integrated piece which includes both regions. The plate 5 can be made of any suitable material known to one of skill in the art. In one embodiment, the plate 5 can be aluminum, which is desirable because it is strong and lightweight, thus allowing for easy installation or removal, for example, by a single individual. The plate 5 can also be made of other materials, such as but not limited to, plastic or steel. The top surface 12 of the plate 5 can be roughened, for example by abrasive blasting with sand, glass beads, crushed glass or other abrasive material, fine cuts, anodizing, and/or other surface treatment, to increase its coefficient of friction, and thereby improve traction, as well as for aesthetic purposes. Anodizing can make aluminum appear black and can increase the coefficient of friction. Anodizing can also increase protection of the material from oxidation. This exemplary embodiment offers advantages in that the frame is integrated into the plates, thus simplifying installation and manufacturing.

In one embodiment, the slots 4, recessed areas 2, abrasive blasting, and transition 3 can all be machined into the plate 5 by a computer numerical control (CNC) machine as described in more detail herein below. The CNC machine can be a milling machine, router, or other similar machine, known by those skilled in the art, capable of effecting the desired pattern and cutting to create the embodiments of the disclosed subject matter.

The size and shape of the plate 5 can vary according to the needs of various entrances. The shape of the plate 5 can be square, rectangular, circular, trapezoidal or any shape desired. The size can be as small or as large as desired. Entrance floor systems with large dimensions can require using two or more plates 5 together, depending on the configuration and materials used. For example, entrance floor systems larger than 5'×'12 or 6'×'15 can, but need not, include two or more plates 5.

Figure 3:
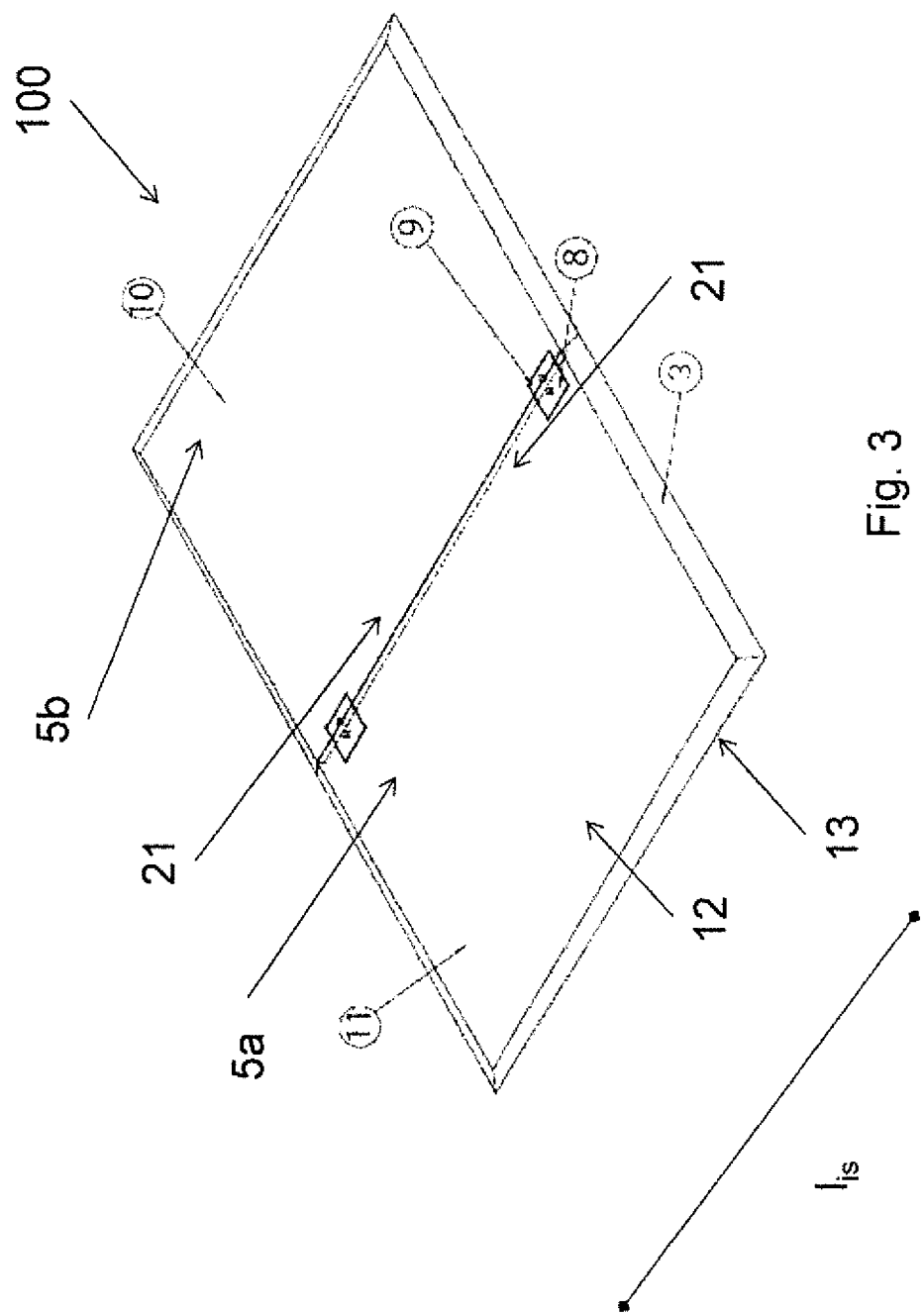
FIG. 3 is a perspective view of an embodiment of the entrance floor system in accordance with the disclosed subject matter.
Figure 4:
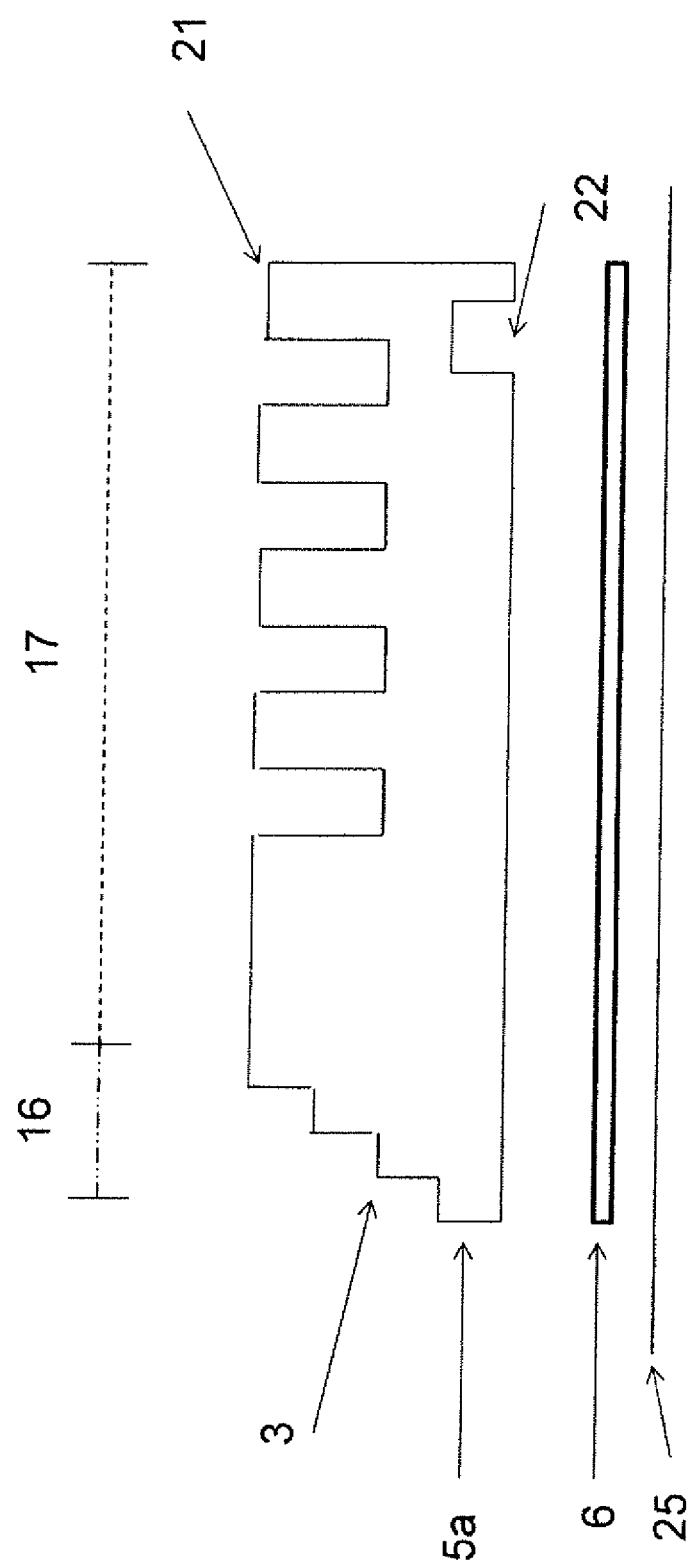
FIG. 4 is a cross-sectional view of a portion of an embodiment of the entrance floor system in accordance with the disclosed subject matter.

Referring now to FIGS. 3-7, for the purposes of illustration and not limitation, in some embodiments, the entrance floor system can include a plurality of plates 5. Such embodiments can have any of the features as discussed herein and above. FIG. 3 shows, for example, an entrance floor system with two plates 5a and 5b, which are shown as see-through so that the connector plates 8 are visible. Any number of plates can be used. Each plate 5a and 5b can have any of the features as the plate 5 described herein above and also includes at least one interior side 21. The interior side 21 of plate 5a is configured to lay adjacent to an interior side 21 of another plate 5b. The interior side has a length $l_{is}$. The interior side 21 is configured without a border region 16 and therefore does not have a transition 3. This allows plates 5a and 5b to sit flush against one another and prevents tripping. The plates 5a and 5b can be any size, any shape, and have any number of interior sides. Plates 5a and 5b do not have to be the same size or shape. The plates 5a and 5b can also have at least one recess 22 in the bottom surface 13 of the plate 5 as shown in FIG. 4, for example. Each recess 22 is proximate an interior side 21. Each recess 22 is not limited to a specific shape and can be, for example, cylindrical, square, rectangular, or the like.

Figures 5A, 5B, 5C:
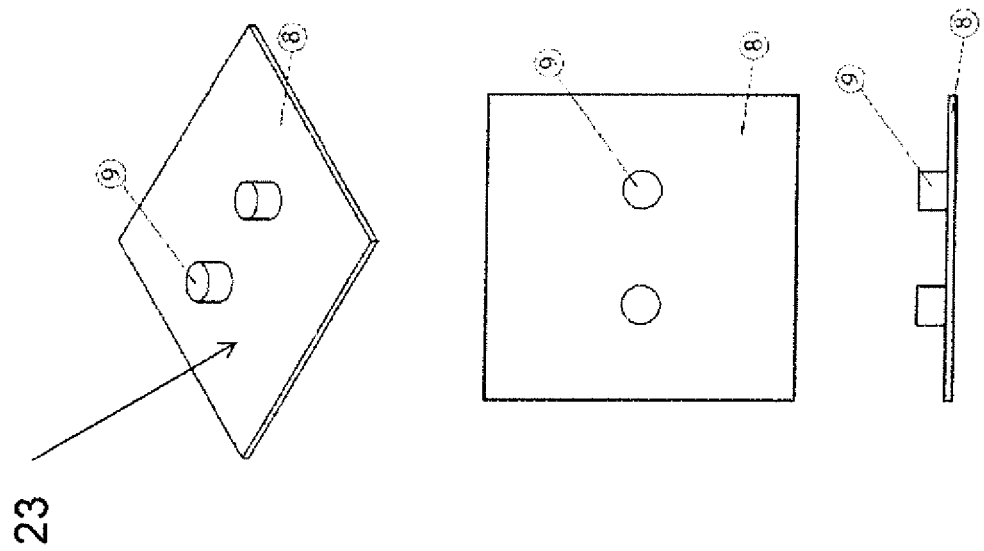
FIGS. 5a-c are perspective, plain, and cross-sectional views, respectively, of an exemplary connector plate in accordance with the disclosed subject matter.
Figure 7:
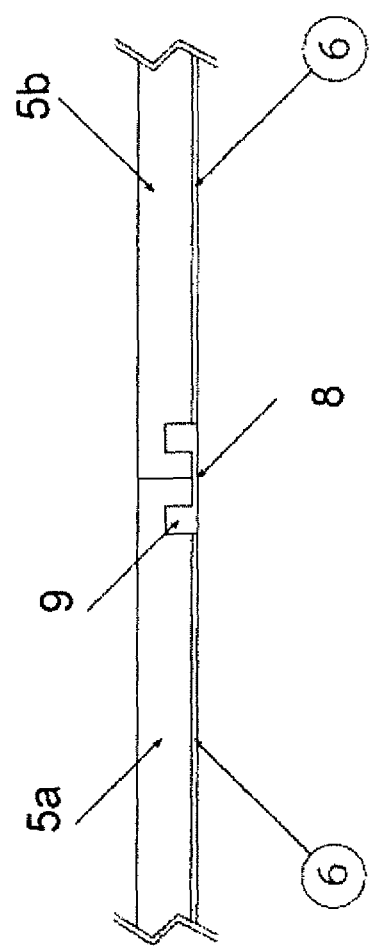
FIG. 7 is a plain view of a portion of an embodiment of the entrance floor system in accordance with the disclosed subject matter.
Figures 9A, 9B:
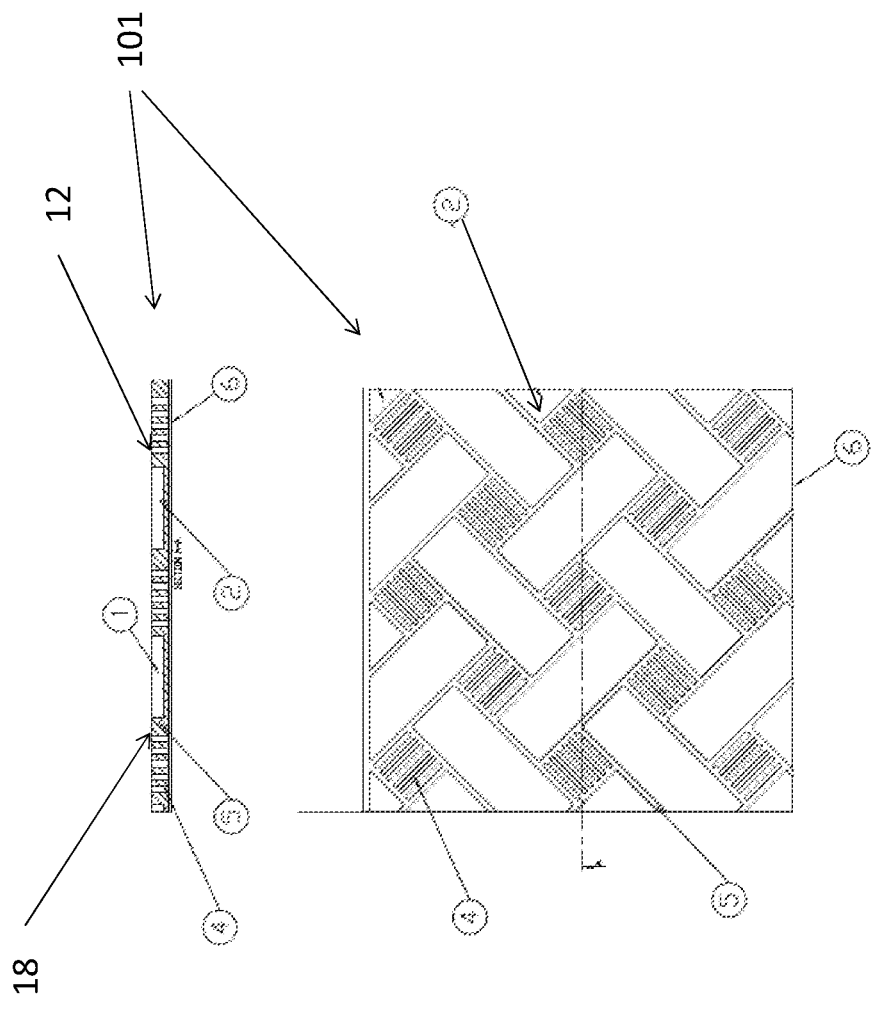
FIGS. 9a-b are cross-sectional and plain views, respectively, of the entrance floor system shown in FIG. 8.

Embodiments with a plurality of plates 5 can also include at least one connector plate 8 as shown in FIGS. 5a-c. The connector plate 8 can be made of thin gauge stainless steel or various other materials known to one of skill in the art which are sufficiently strong or rigid to keep the adjacent sections in place relative to one another. The connector plate 8 has a base 23 and first and second pegs 9. The base 23 can be configured to rest on the top surface 14 of the base mat 6. The base 23 can be adhered to the top surface 14 of the base mat 6 by waterproof adhesive, double-faced tape, or other known methods. The pegs 9 can be configured such that the first peg 9 engages with a recess 22 of plate 5a and the second peg 9 engages with a recess 22 of adjacent plate 5b. In another embodiment, shown in FIGS. 6a-c and 7, for the purpose of illustration and not limitation, the connector plate 8 can be a continuous extrusion that has a substantially similar length l to the interior side of a plate 5 (shown in FIG. 3). As used herein, substantially similar length means the lengths are within 1 inch, preferably within ½ inch, more preferably within ¼ inch, even more preferably within ⅛ inch and most preferably within 1/16 inch of one another. The extrusion can include first and second pegs 9 which are rectangular members that run the length l of the connector plate. The first peg 9 can be configured to engage a recess 22 of a first plate 5a. The first peg 9 and the first plate 5a can have substantially the same length. Alternatively, the length of the first peg 9 can be less than the length of the first plate 5a. The second peg 9 can be configured to engage a recess 22 of an adjacent plate 5b. Alternatively, the length of the second peg 9 can be less than the length of the adjacent plate 5b. The second peg 9 and the adjacent plate 5b can have substantially the same length. The pegs can be any shape that facilitates holding the plates 5a and 5b in place, including cylinders, rectangles, square, or other suitable shapes.

The connector plate 8 holds the plurality of plates 5a and 5b close to one another, reducing sliding and the potential of a tripping hazard. While the entrance floor system 100 shown in FIG. 3 uses two connector plates 8, any suitable number of connector plates 8 can be used to hold any number of plates 5 together. Connector plate 8, or variants thereof, could alternatively or additionally be configured to rest under the bottom surface of the base mat, or could be implemented face-down in recessed portions of the top surface of the plate.

An exemplary embodiment of another entrance floor system, in accordance with the disclosed subject matter, is shown in FIGS. 8-11 for the purpose of illustration and not limitation. FIGS. 9a and 9b show cross-sectional and plain views, respectively, of the entrance floor system 101 designed to be placed in a floor recess 26. The floor recess has a depth d as shown in FIG. 11. FIG. 8 shows an exploded view of the entrance floor system 101 of FIG. 9. The entrance floor system 101 includes a plate 5 and a base mat 6. The plate 5 and the base mat 6 can have substantially the same dimensions. In other embodiments, the base mat 6 is optional.

The base mat 6 has a top surface 14 and a bottom surface 15, which are opposite one another. The bottom surface 15 of the base mat 6 is configured to rest within a floor recess 26. The base mat 6 can have substantially the same dimensions of the floor recess 26. The base mat 6 can preferably be made of a thin substrate, for example recycled rubber, neoprene, or other similar material that can have shock absorbency. The base mat can be functional to absorb shock of people or other objects moving about the top of the entrance floor system 101. In some embodiments, the base mat can be composed of other materials which have limited or no shock absorbency. The base mat also has a height $h_m$ as shown in FIG. 11.

The plate 5 has a top surface 12 and a bottom surface 13, which are opposite one another. The plate 5 also has a height $h_p$ as shown in FIG. 11. The floor system 101 has a total height h including the plate height $h_p$ and the base mat height $h_m$. The total height h can be substantially equal to the recess depth d. As used herein, substantially equal means when the base mat 6 and plate 5 are placed within the recess 26, the top surface 12 of the plate 5 and the floor surface 25 will sit within ¼ inch, even more preferably within ⅛ inch and most preferably within 1/16 inch. In some embodiments, either the plate height $h_p$ or the base mat height $h_m$ can be adjusted to ensure that the total height is substantially equal to the recess depth d. Accordingly, the plate 5 can be flush with the surrounding floor 25 which prevents tripping and provides a smooth surface for wheels. The disclosed subject matter, however, is not so limited, and in other embodiments, the heights $h_p$ and $h_m$ can be adjusted in numerous different configurations.

The bottom surface 13 of the plate 5 is configured to rest on the top surface 14 of the base mat 6. The top surface 12 of the plate 5 has a pattern machined therein. The pattern includes a plurality of slots 4. It will be appreciated that the term pattern, as used herein, can include a plurality of patterns that can be, but need not be, related to one another and the subject matter herein is not limited to any particular pattern or configurations. The pattern can include an interior pattern and a separate border pattern. At least one of the slots 4 can be configured to receive water and debris. The slots 4 can also be functional to increase slip resistance. In some embodiments, the slots 4 will not extend between the top surface 12 of the plate 5 and the bottom surface 13 of the plate 5 (e.g., slots 4 shown in FIG. 19*b*). In such embodiments, water and debris may collect in the slots 4. This can prevent dirt from getting under the plate 5 and therefore the plate 5 would not need to be lifted during cleaning; rather cleaning in this embodiment could be performed from the surface of the plate 5. In some embodiments, the slots 4 can extend between the top surface 12 of the plate 5 and the bottom surface 13 of the plate 5 (e.g., slots 4 shown in FIG. 9*a*). In such embodiments, water or debris can move from the top surface 12 of the plate 5 to the top surface 14 of the base mat 6. The plate 5 can be lifted and/or moved periodically for cleaning underneath. As used herein, the term slot is not limited to long thin openings, and is recognized to include any suitable shape including, but not limited to long and thin, round, oval, rectangular, triangular, and the like.

As shown in FIG. 8, the top surface 12 of the plate 5 can include an upper surface area 18 and a recessed area 2. The recessed area 2 sits a depth below the upper surface area 18. The depth can vary depending on the purpose of the recessed area 2. For example, the depth can be about 40% to about 67% of the height of the plate if the recess receives an insert. Alternatively the depth can be about 17% to about 50% of the height of the plate if the recess is configured to receive water and debris. In alternate embodiments, other suitable depths can be used. At least a portion of the recessed area 2 can be configured to receive fluid and debris. The entrance floor system 101 can further include at least one insert 1. The inserts have a top 19 and a bottom 20. The bottom 20 is attached to at least a portion of the recessed area 2. The bottom 20 can be attached such that the top 19 of the insert 1 can sit higher than the upper surface area 18. This can increase traction, prevent slipping, and can also knock debris or water from shoes. The inserts 1 can be made from carpet, recycled rubber, abrasive tape, abrasive strips, combinations thereof or other suitable materials known to one of ordinary skill in the art. The inserts 1 can be adhered in place using standard or waterproof adhesives, hook and loop systems (e.g., Velcro), or other known means. In another embodiment, the top 19 of the insert 1 can be configured to sit flush with, or lower than, the upper surface area 18.

In one embodiment, the plate 5 can be a monolithic or integral piece of material. The plate 5 can be made of any suitable material known to one of skill in the art. In one embodiment, the plate 5 can be aluminum, which is desirable because it is strong and lightweight. This allows for easy installation or removal, for example, by a single individual. The plate 5 can also be made of other materials, such as but not limited to plastic or steel. The top surface 12 of the plate 5 can be roughened, for example by abrasive blasting with sand, glass beads, crushed glass or other abrasive material, fine cuts, anodizing, surface abrasion, and/or other surface treatment, to increase its coefficient of friction, and thereby improve traction, as well as for aesthetic purposes. Anodizing can make aluminum appear black and can increase the coefficient of friction. Anodizing can also protect the material from oxidation.

In one embodiment, the slots 4, recessed areas 2, and abrasive blasting can all be machined into the plate 5 by a CNC machine or similar means. The size and shape of the plate 5 can vary according to the needs of various entrances. The shape of the plate 5 can be square, rectangular, circular, trapezoidal, or any shape desired. The size can be as small or as large as desired. Entrance floor systems with large dimensions can require using two or more plates 5 together, depending on the configuration and materials used. For example, entrance floor systems larger than 5'×'12 or 6'×'15 can, but need not, include two or more plates 5.

Referring now to FIGS. 10 and 11 for the purpose of illustration and not limitation, in some embodiments, the entrance floor system can include a plurality of plates 5. Such embodiments can have any of the features as discussed herein and above. FIG. 10 shows, for example, an entrance floor system 101 with two plates 5*a* and 5*b*. The plates 5*a* and 5*b* are drawn as see-through so that the connector plate 8 underneath is visible. Any number of plates can be used. Each plate 5*a* and 5*b* can have any of the features as the plate 5 described herein above and also includes at least one interior side 21. The interior side 21 of plate 5*a* is configured to lay adjacent to an interior side 21 of another plate 5*b*. This allows plate 5*a* and 5*b* to sit flush against one another and prevents tripping. The plates 5*a* and 5*b* can be any size, any shape, and have any number of interior sides. Plates 5*a* and 5*b* do not have to be the same size or shape. The plates 5*a* and 5*b* can also have at least one recess 22 in the bottom plate surface 13 as shown in FIG. 11, for example. Each recess 22 is proximate an interior side 21. Each recess 22 is not limited to a specific shape and can be, for example, cylindrical, square, rectangular, or the like, or can include other custom designs or shapes. As shown in FIG. 10, entrance floor system 101 with a plurality of plates 5*a* and 5*b* can use a plate 8 (described above) to hold the plates 5*a* and 5*b* together. Alternatively, the connector shown in FIGS. 6-7 and described above could be used in this embodiment.

It will be appreciated that the surface floor system 101 can have any of the features discussed herein and above.

In accordance with another aspect of the disclosed subject matter, a method of preparing an entrance floor system is provided. Flow charts of exemplary methods are provided in FIGS. 12 and 13 for the purpose of illustration and not limitation. The method includes obtaining a floor plate design (27). Such designs can be provided by a customer. It can be any suitable design such as a new design, a custom design, or a stock design. The design can include information about the size or shape of the floor plate, as well as any designs machined into the surface floor system. The design is converted into instructions readable by a CNC machine (28). For example, the instructions can be G and M codes that a CNC machine understands. The G code or Go code can provide the machine with precise movements, turns and cuts. The M code can turn on and off fluids and other accessory devices as known to one of ordinary skill in the art. The instructions can be created with a computer aided machining program, which can be a part of a computer aided design (CAD) program. The method further includes operating the CNC machine in accordance with the instructions to cut, drill, or mill the design into a piece of material to provide a plate (29) in accordance with the embodiments of the disclosed subject matter. The plate can have opposing bottom and top surfaces and a pattern including a plurality of slots machined in the top surface of the plate. The top surface of the plate can include a border region and a non-border region. The non-border region of the top surface of the plate can be substantially parallel with the bottom surface of the plate. The plate can be any of the plates (5, 5*a*, 5*b*) described herein above and can include any of the features of the plates (5, 5*a*, 5*b*) described herein above. Accordingly, the method can provide any of the entrance floor systems (100, 101) described herein above and can include any of the features described herein above.

As shown in FIG. 13 for the purpose of illustration and not limitation, the method can include cutting a base mat to substantially similar dimensions as the plate (33). The method can alternatively or additionally include manually adjusting the design in the instructions readable by a CNC machine (32). In some embodiments, the method can include inputting the design into a computer aided design program (CAD) (30). The design can be manually adjusted in the CAD program (31). For example, the depth and shape of each machine recess can be adjusted to be more easily accepted by the CNC machine. These adjustments can decrease machine time, improve aesthetics or performance, or allow for integration of various insert materials. The method can include providing a chemical treatment to the plate (34) thereby preventing oxidation. The chemical treatment can include a chemical finish or a coating. The method can include anodizing the plate (35), particularly if the plate is aluminum. Anodizing can make the aluminum appear black. Also, it can increase the coefficient of friction to reduce slipping hazards. Furthermore, anodizing also protects the material from oxidation.

Figure 12:
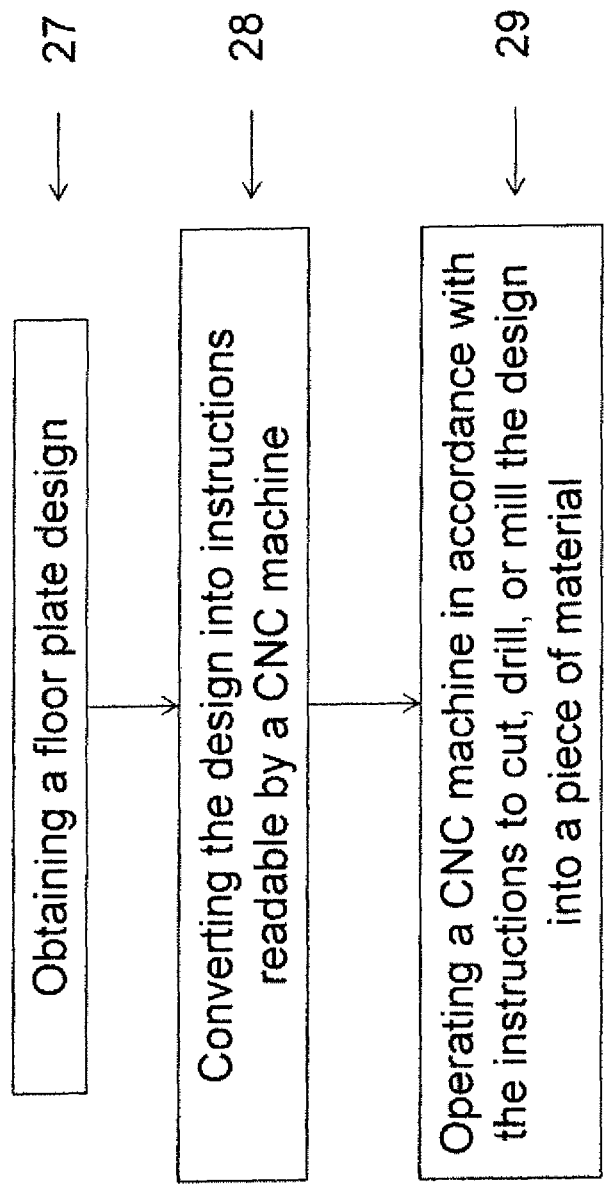
FIG. 12 is a flow chart of a method for preparing an entrance floor system in accordance with the disclosed subject matter.
Figure 16:
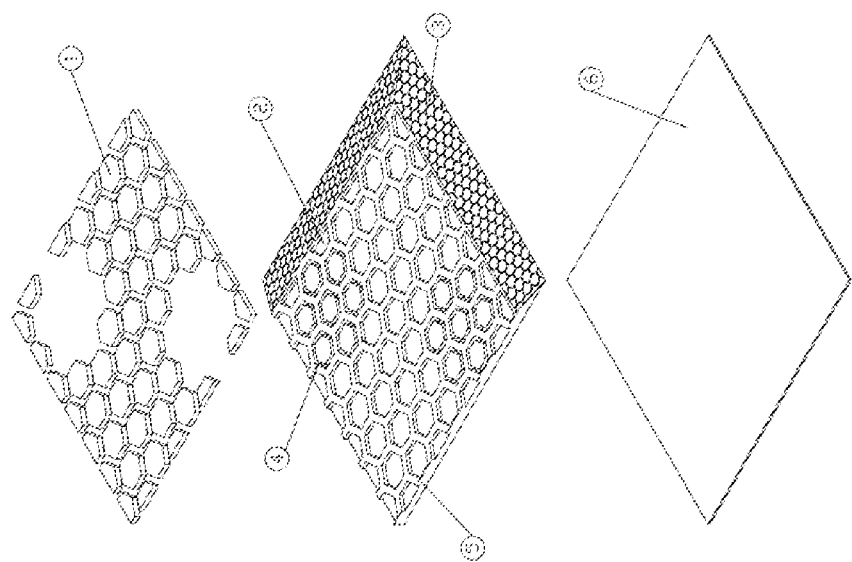
FIG. 16 is an exploded view of the entrance floor system shown in FIGS. 15a-c.

In accordance with another aspect of the disclosed subject matter, an entrance floor system prepared by a process is provided. The entrance floor system is prepared by the process described herein above. Exemplary processes are shown in FIGS. 12 and 13 for the purpose of illustration and not limitation. Accordingly the entrance floor system provided by the process can be any of the entrance floor systems (100, 101) described herein above and can include any of the features described herein above.

It is understood that the entrance floor system may have any desired design machined in the plate, including in non-border regions 17 and border regions 16. For example, FIGS. 1, 2*a*, 8, and 9*b*, show a design wherein the slots 4 provide a plurality of diamonds and the inserts provide a weave pattern around the diamonds. FIGS. 14-20 and 26-34 for the purpose of illustration and not limitation provide other exemplary designs.

FIGS. 14*a*-14*c* show an exemplary entrance floor system having a design entirely of slots 4. The slots provide an interlocking "I" pattern. In such an embodiment, no inserts are required.

FIGS. 15*a*-*c* and 16, for the purpose of illustration and not limitation, show another exemplary entrance floor system having a honeycomb design. The slots 4 outline a plurality of hexagons. The hexagons provided by the slots 4 are surrounded by a plurality of hexagons provided by the recessed areas 2. Inserts 1, shaped as hexagons, can be attached to the recessed area 2, as described above. The embodiment in FIGS. 15*a*-*c* and 16 also shows an example of a design or pattern in the border region 16, with the transition 3 having a honeycomb design machined therein.

FIGS. 17*a*-*c* show an exemplary entrance floor system having slots 4 with varying depth. In some embodiments, the slots 4 can have a slot depth and the pattern can be machined such that the slot depth varies along a length of the plate 5. This can provide a ghosting effect which can be used to provide a variety of different designs. For example, as shown in FIGS. 17*a*-*c*, the ghosting effect can provide the appearance of diamond regions surrounded by darker lines. The entrance floor system of FIGS. 17*a*-*c* also has a checkered or diamond pattern machined into the transition 3 of the border region 16.

FIGS. 18*a*-*c*, for the purpose of illustration and not limitation, show an entrance floor system having a swirling design. The swirling design is composed entirely of slots 4. Such a design does not include inserts 1 but alternate designs can include inserts. The entrance floor system of FIGS. 18*a*-*c* has a stepped transition 3 as described herein above.

FIGS. 19*a*-*c*, for the purpose of illustration and not limitation, show an exemplary entrance floor system without a border region, having a swirling design. The design is the same as shown in FIGS. 18*a*-*c*.

Figure 20:
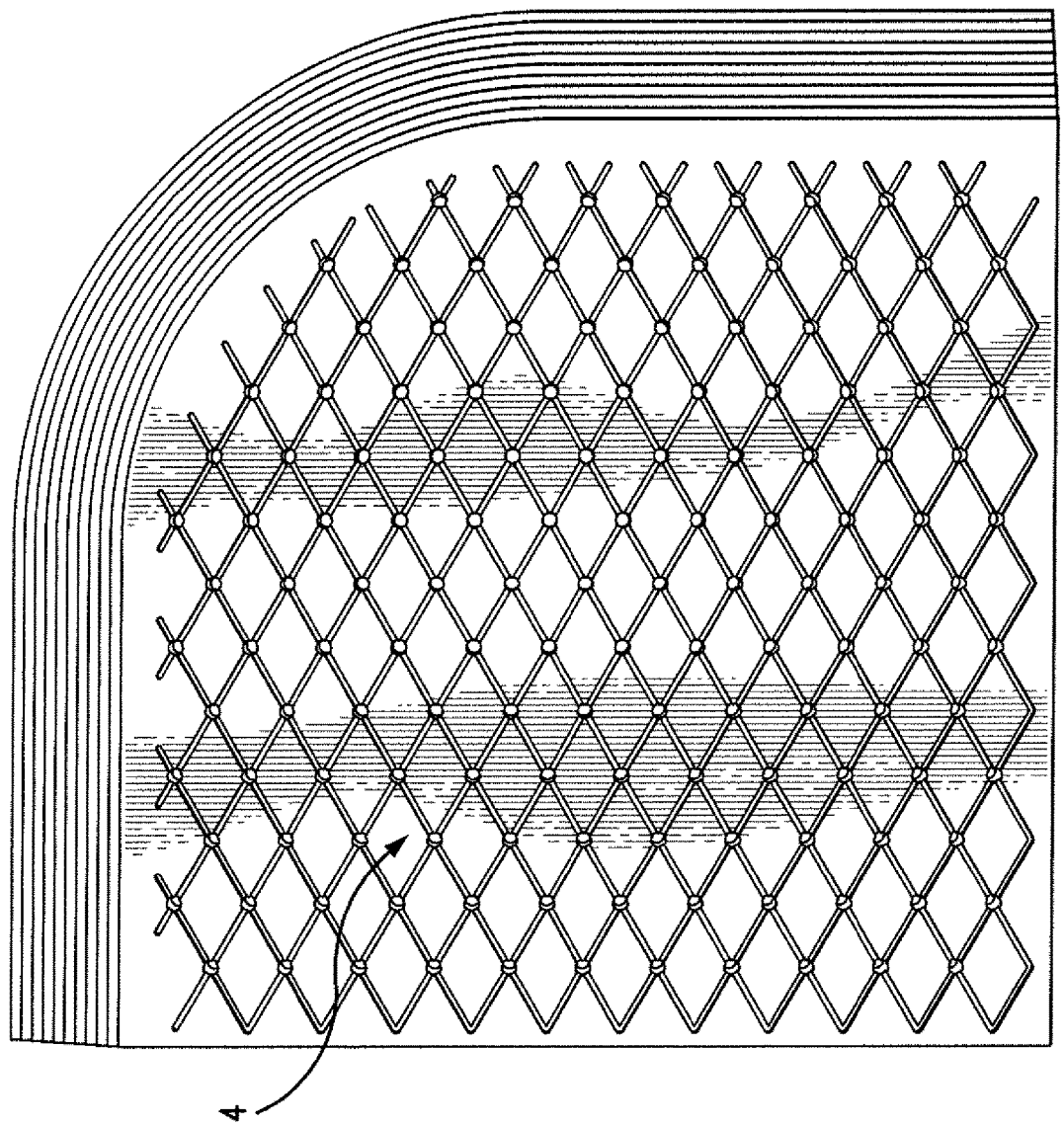
FIG. 20 is a photograph of a plate in accordance with one embodiment of the disclosed subject matter.
Figure 21:
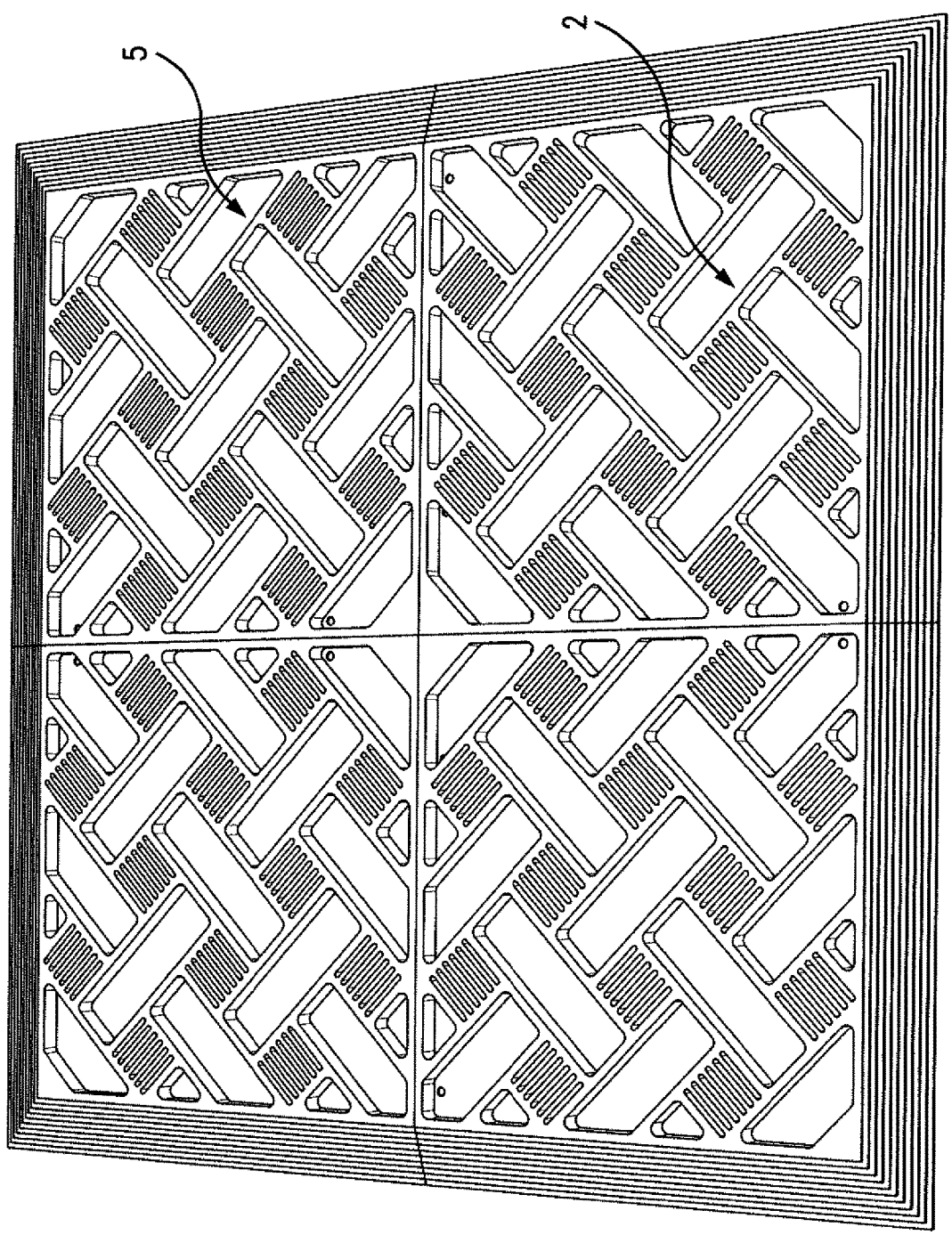
FIG. 21 is a photograph of an embodiment of the entrance floor system in accordance with the disclosed subject matter.
Figure 22:
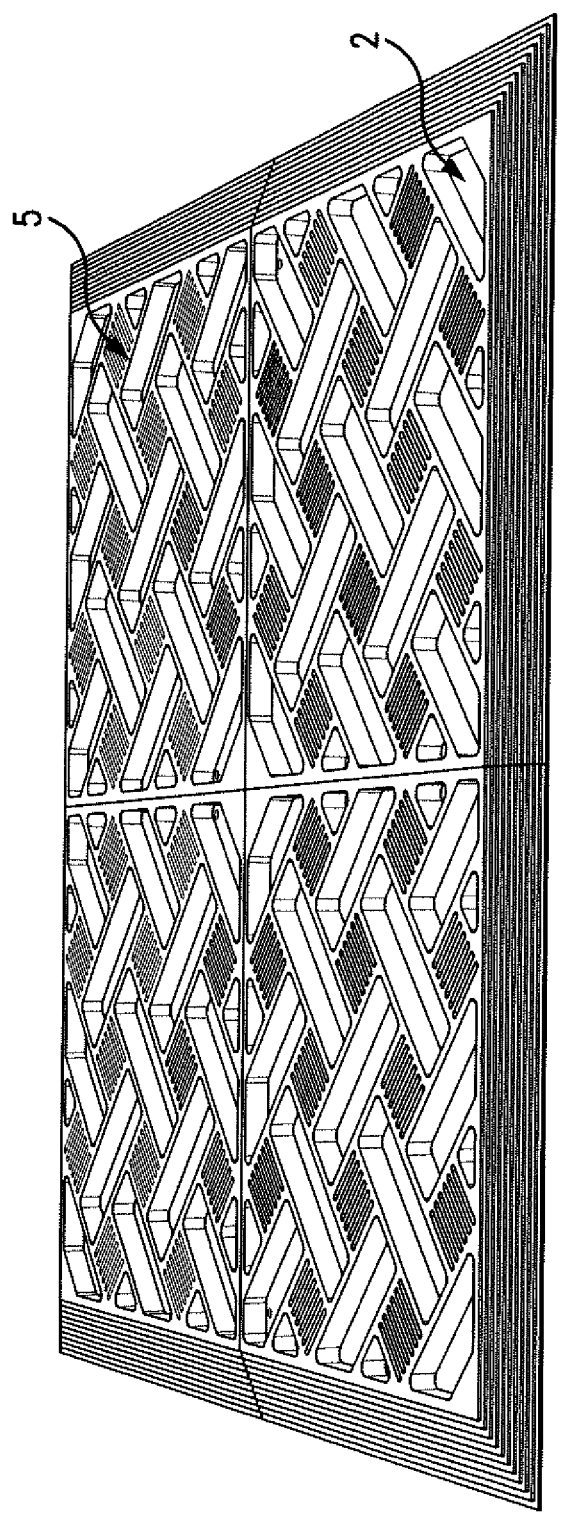
FIG. 22 is a photograph of an embodiment of the entrance floor system in accordance with the disclosed subject matter.
Figure 23:
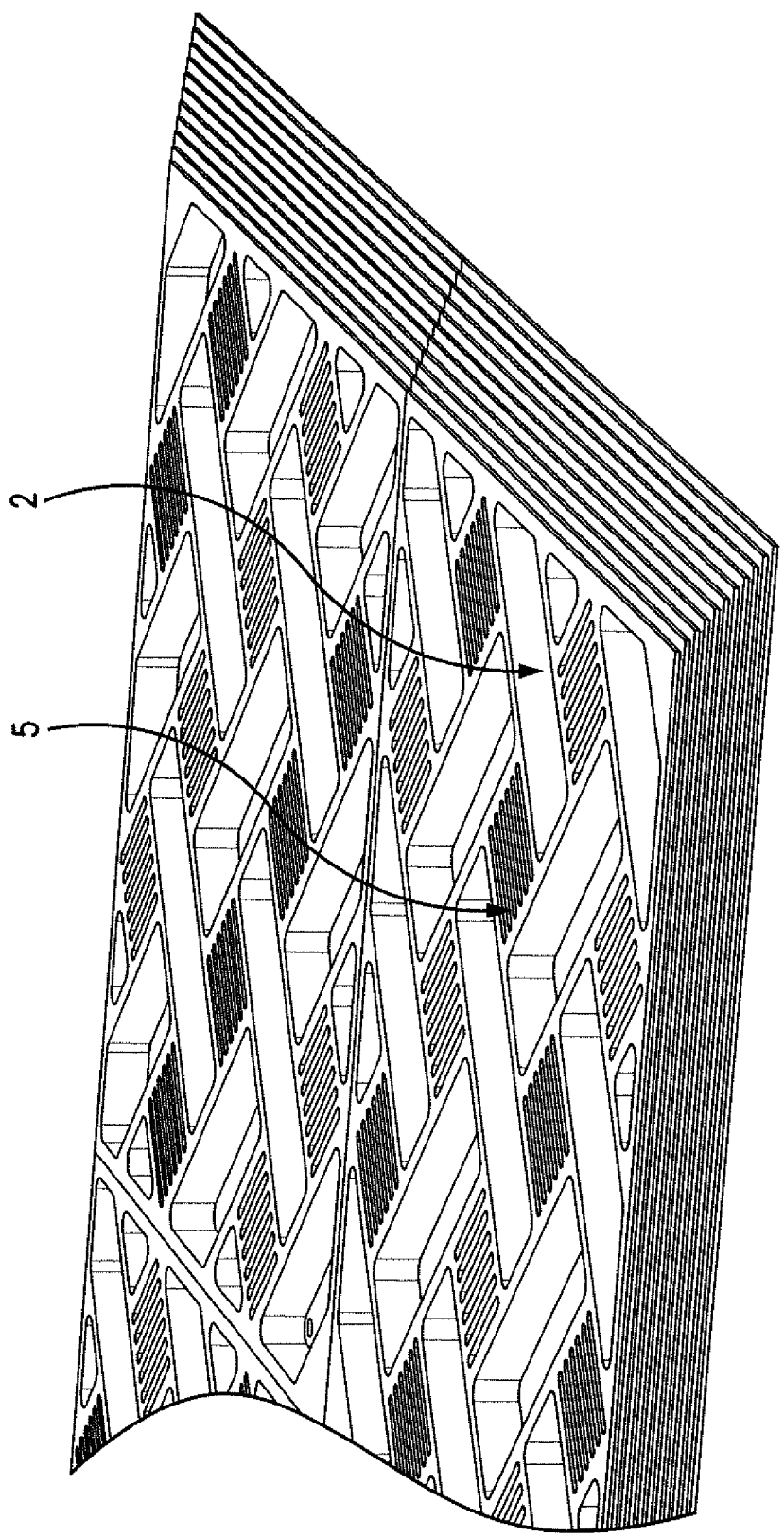
FIG. 23 is a photograph of an embodiment of the entrance floor system in accordance with the disclosed subject matter.

FIG. 20, for the purpose of illustration and not limitation, shows a photograph of a portion of an entrance floor system. The slots 4 provide a criss-cross pattern, and at the crossing points the slots 4 extend between the bottom and top surfaces of the plate, allowing water and debris to move through. The entrance floor system shown is an example of a non-square corner. Entrance floor systems of all shapes are contemplated in accordance with the subject matter disclosed herein.

Figure 24:
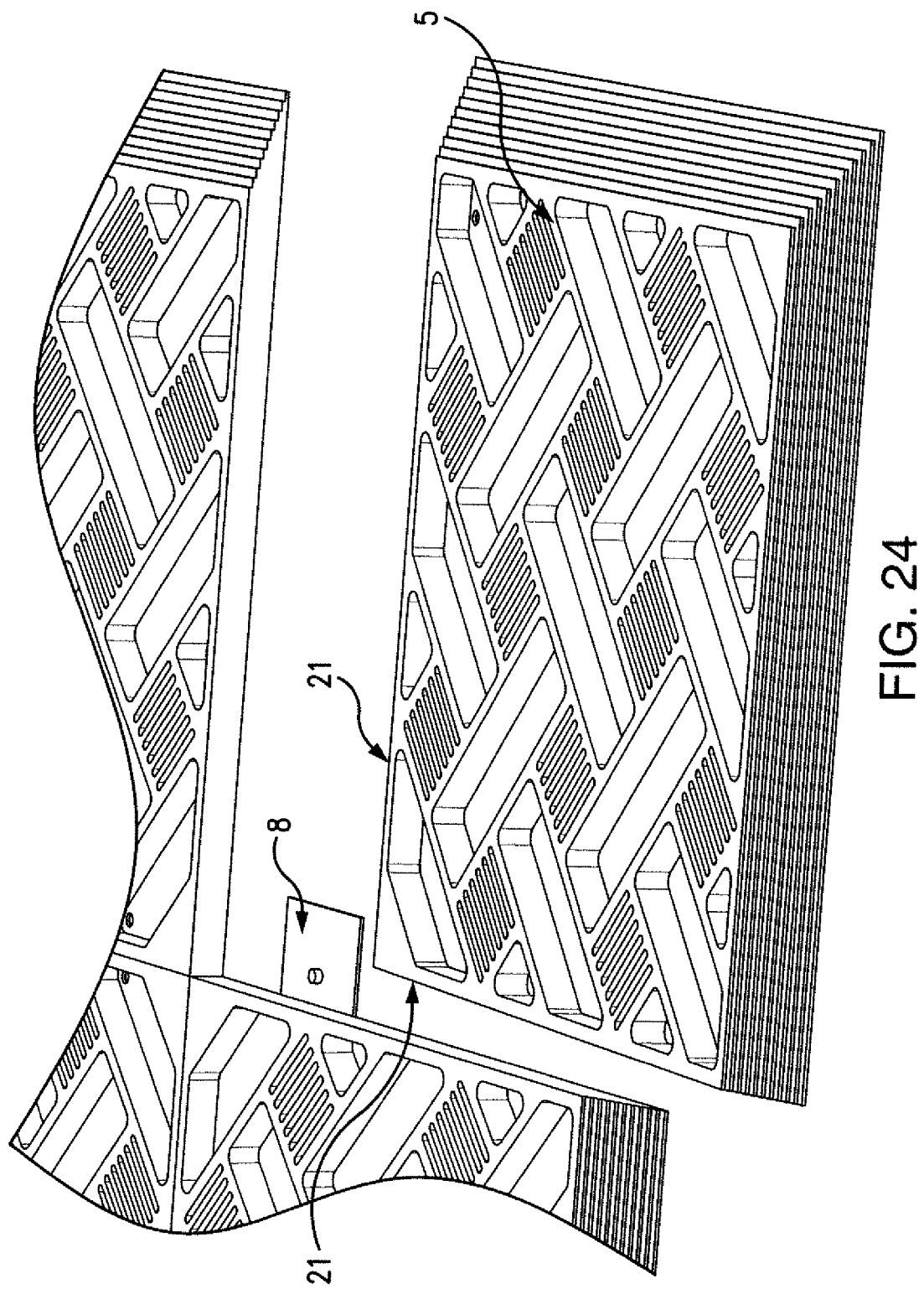
FIG. 24 is a photograph of several plates and a connector plate in accordance with one embodiment of the disclosed subject matter.
Figure 25:
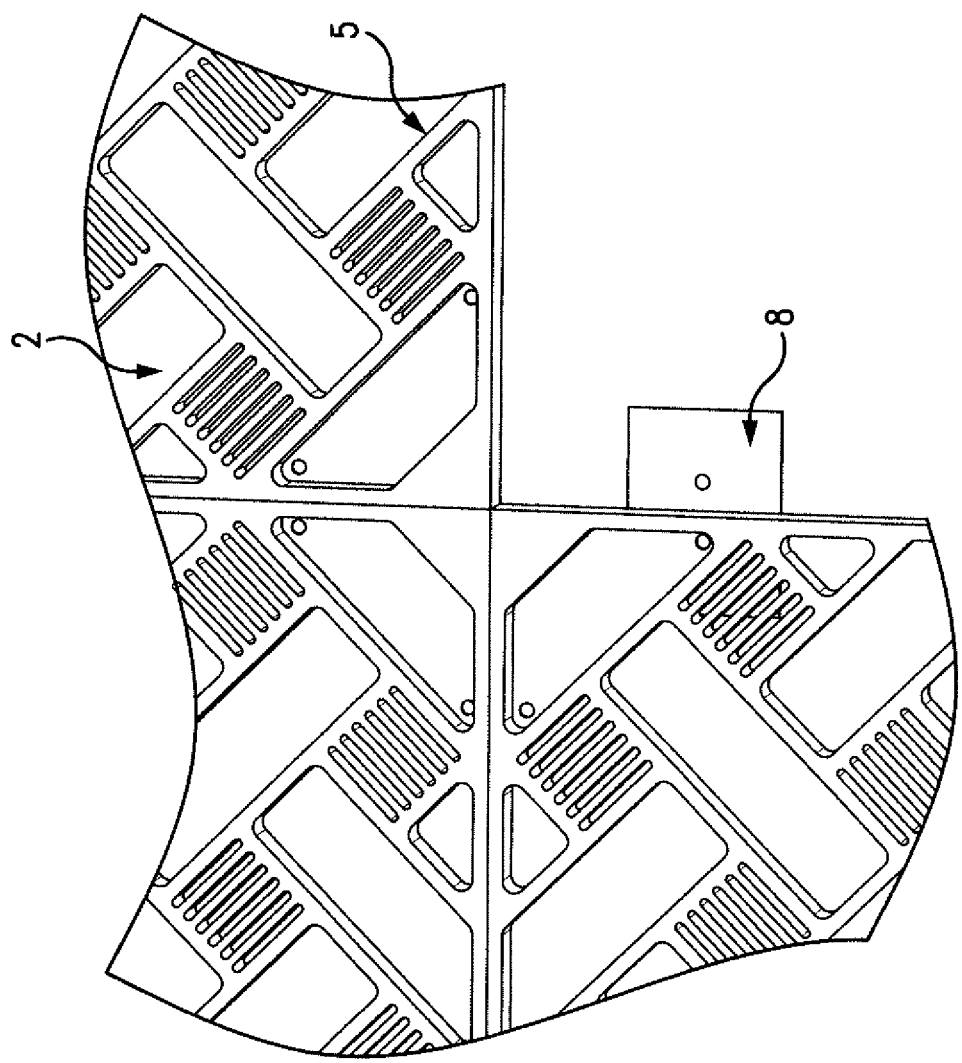
FIG. 25 is a photograph of several plates and a connector plate in accordance with one embodiment of the disclosed subject matter.

FIGS. 21-25, for the purpose of illustration and not limitation, are photographs of an embodiment of an entrance floor system having four plates 5. The plates 5 each have two interior sides 21 as shown in FIG. 24. A connector plate 8, used to connect adjacent plates 5 can be seen in FIGS. 24 and 25 where one plate 5 has been removed. In the photographs, recessed areas 2 are visible and inserts 1 have not yet been added.

Figure 26B:
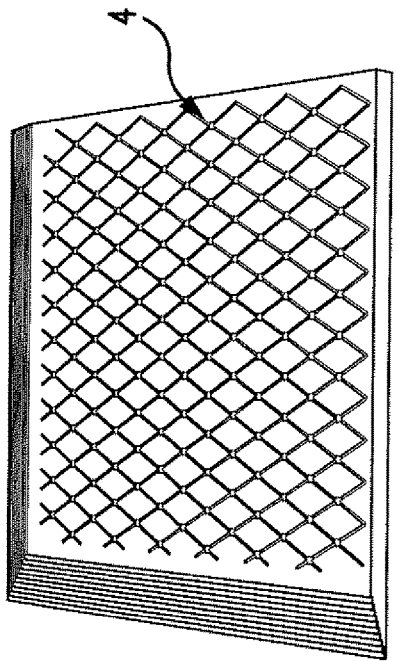
FIGS. 26a-c are photographs of a plate in accordance with one embodiment of the disclosed subject matter.
Figure 26C:
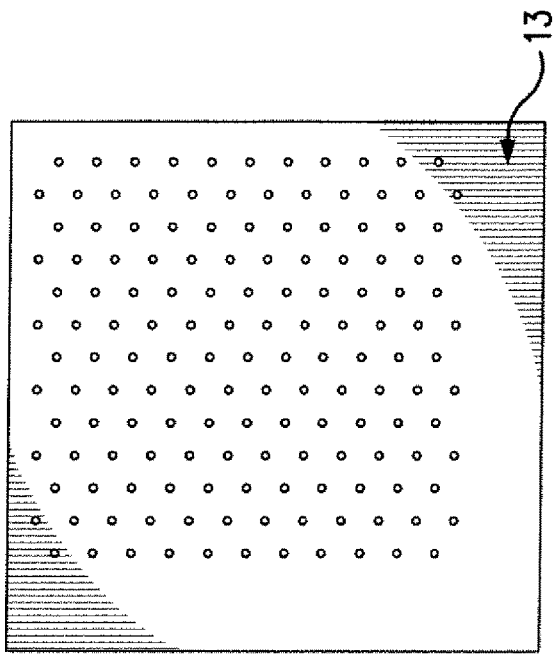
Figure 26A:
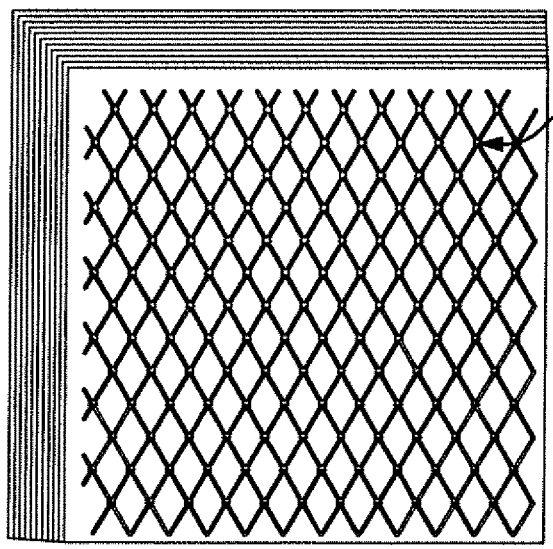

FIGS. 26*a*-*c* show photographs of an exemplary embodiment of the entrance floor system. The slots 4 provide a criss-cross pattern, and at the crossing points the slots 4 extend between the bottom and top surfaces of the plate to allow water or debris to move from the top surface of the plate to the top surface of the base mat. FIG. 26*c* shows the bottom surface 13 of the plate.

FIGS. 27*a*-*c*, for the purpose of illustration and not limitation, show photographs of an embodiment of the entrance floor system. The slots 4 provide an "I" pattern also shown in FIG. 12. Some of the slots 4 extend between the bottom and top surfaces of the plate to allow water or debris to move from the top surface of the plate to the top surface of the base mat. FIG. 27*c* shows the bottom surface 13 of the plate.

Figure 28A:
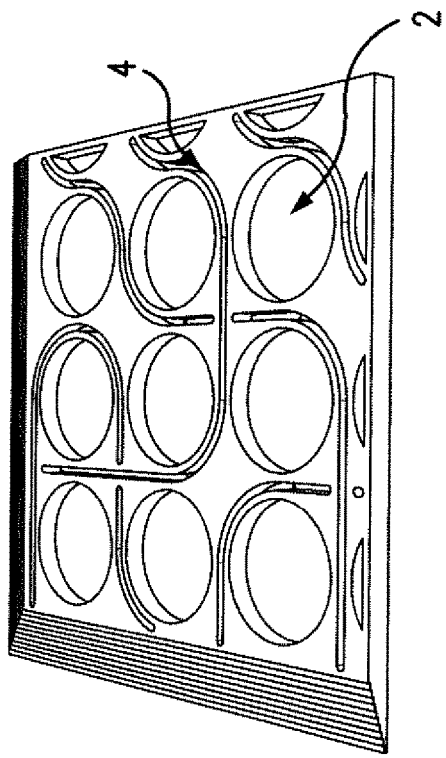
FIGS. 28a-c are photographs of a plate in accordance with one embodiment of the disclosed subject matter.
Figure 28C:
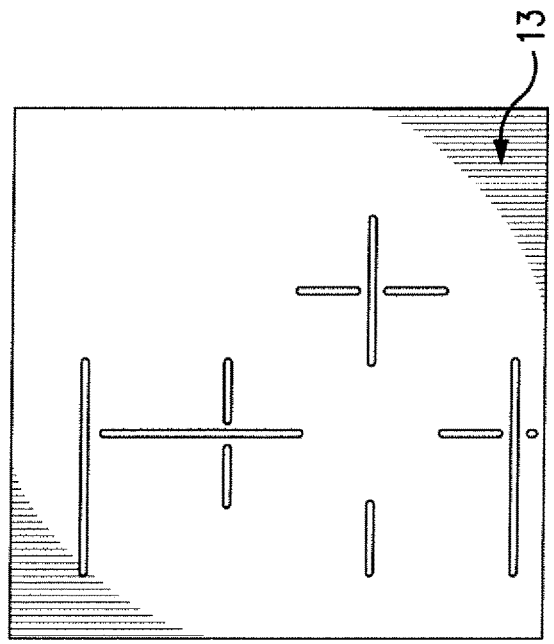
Figure 28B:
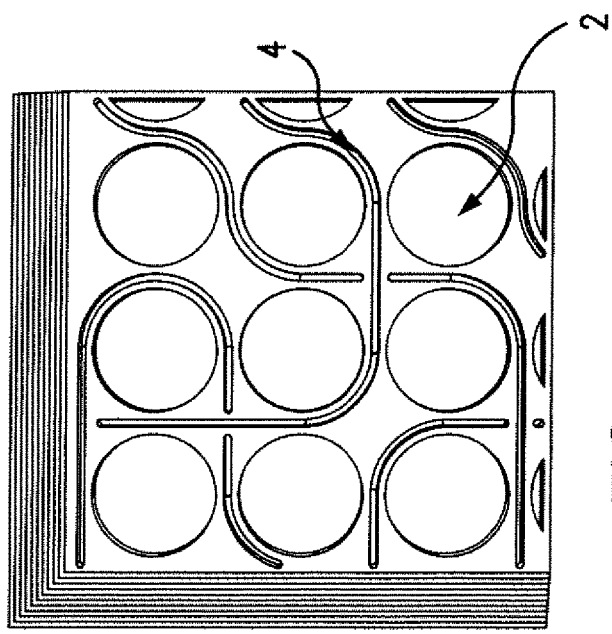
Figure 29:
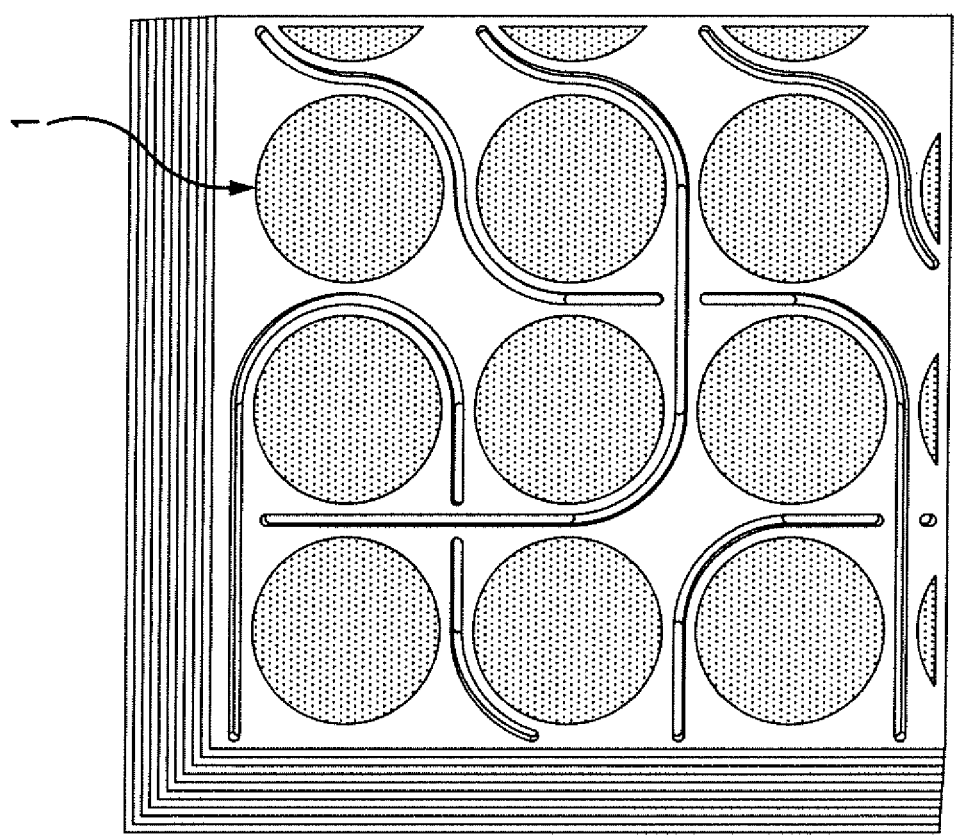
FIG. 29 is a photograph of a plate in accordance with one embodiment of the disclosed subject matter.

FIGS. 28*a*-*c* and 29 show photographs of an exemplary embodiment of the entrance floor system. The slots 4 are long and curved, weaving between circular recessed regions 2. The recessed regions are configured to receive inserts 1 (as shown in FIG. 29). Some of the slots extend between the bottom and top surfaces of the plate to allow water or debris to move from the top surface of the plate to the top surface of the base mat. FIG. 28*c* shows the bottom surface 13 of the plate.

Figure 30B:
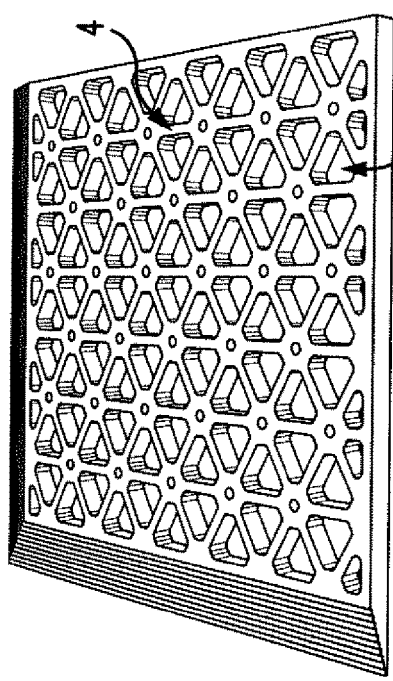
FIGS. 30a-c are photographs of a plate in accordance with one embodiment of the disclosed subject matter.
Figure 30C:
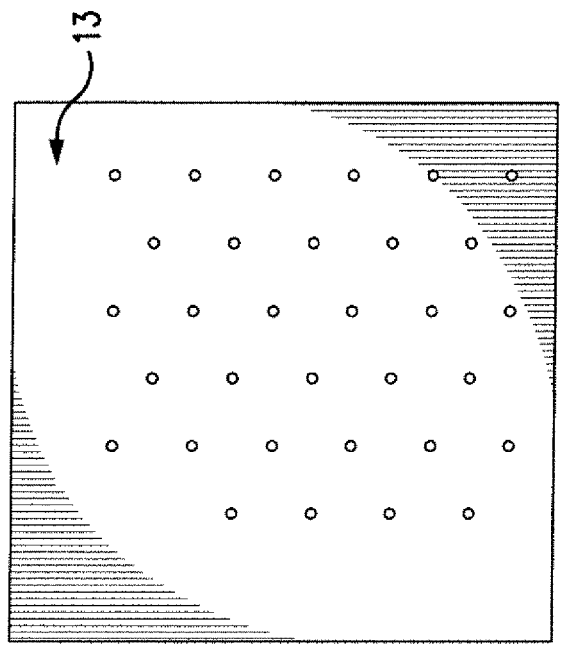
Figure 30A:
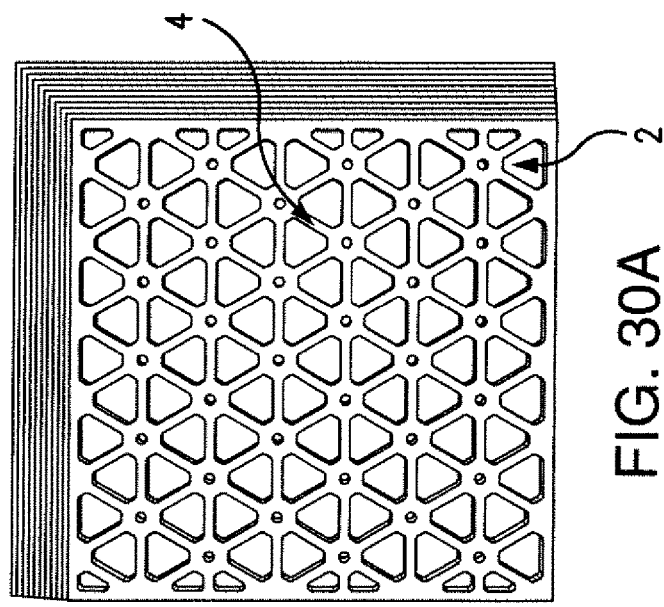
Figure 31:
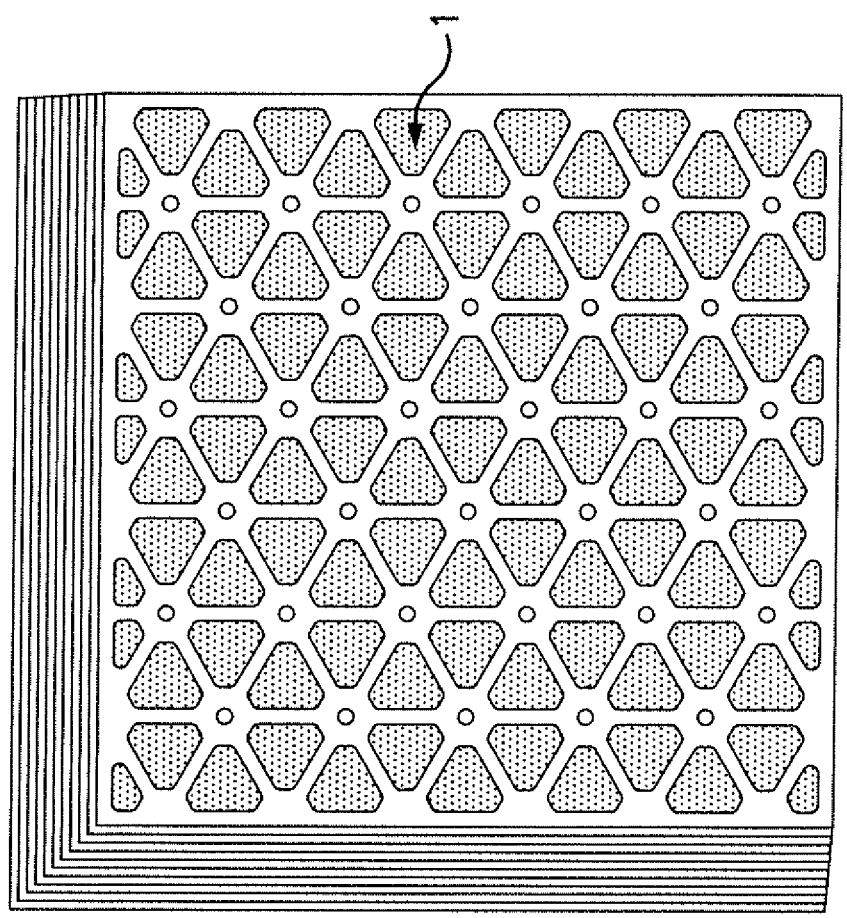
FIG. 31 is a photograph of a plate in accordance with one embodiment of the disclosed subject matter.

FIGS. 30*a*-*c* and 31, for the purpose of illustration and not limitation, show photographs of an embodiment of the entrance floor system. A plurality of slots 4 are circular and extend between the bottom and top surfaces of the plate to allow water or debris to move from the top surface of the plate to the top surface of the base mat. The slots 4 are located at the center points of hexagons provided by triangular recessed regions 2. The recessed regions 2 are configured to receive inserts 1 (as shown in FIG. 31). FIG. 30*c* shows the bottom surface 13 of the plate.

Figure 32B:
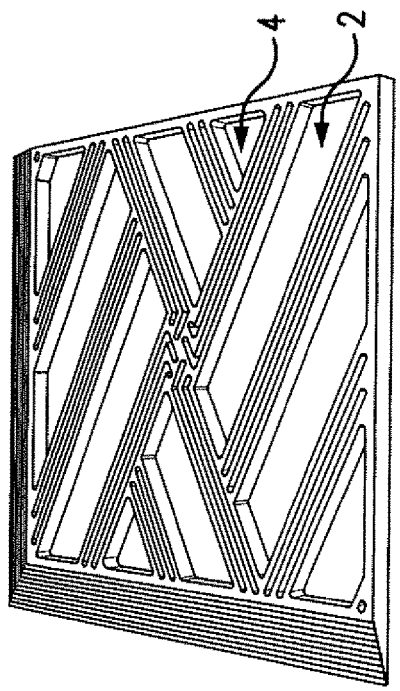
FIGS. 32a-c are photographs of a plate in accordance with one embodiment of the disclosed subject matter.
Figure 32C:
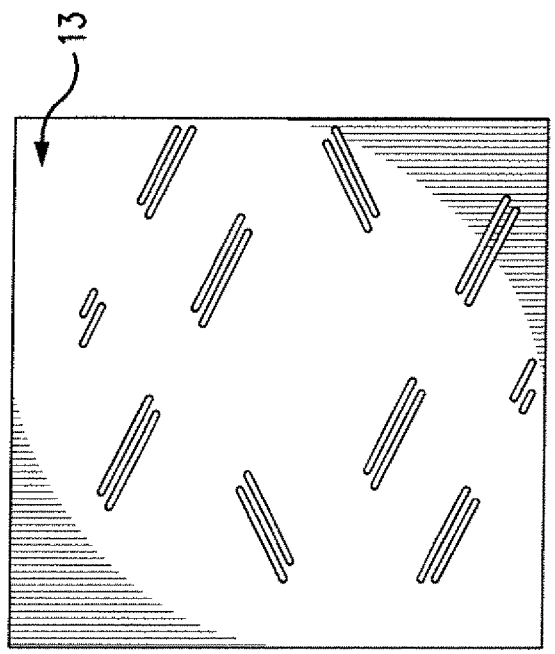
Figure 32A:
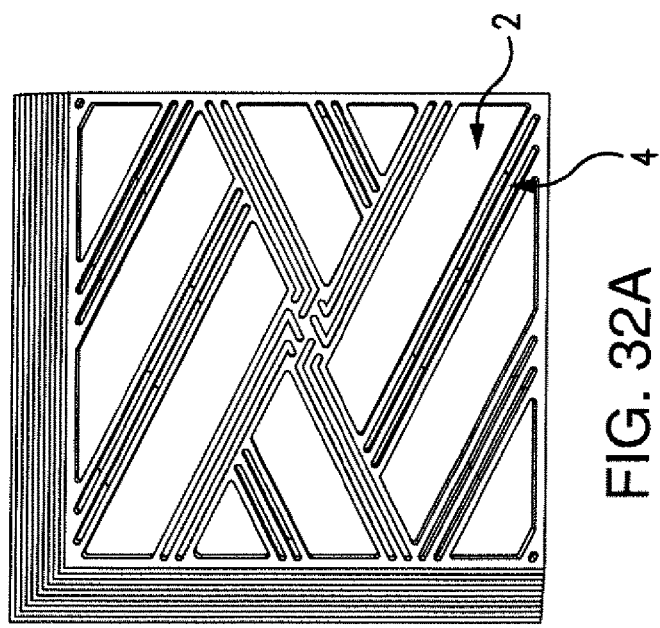
Figure 33B:
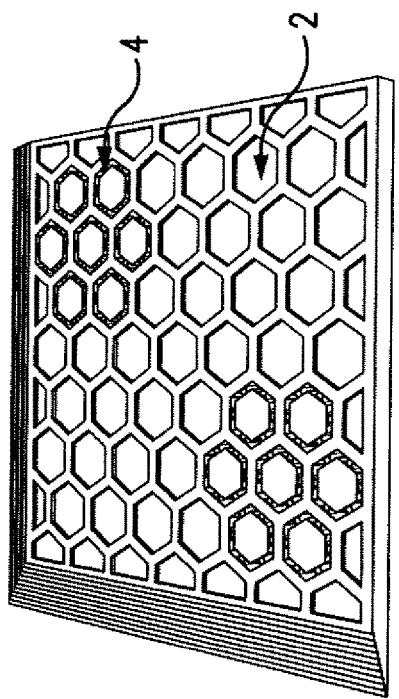
FIGS. 33a-c are photographs of a plate in accordance with one embodiment of the disclosed subject matter.
Figure 33C:
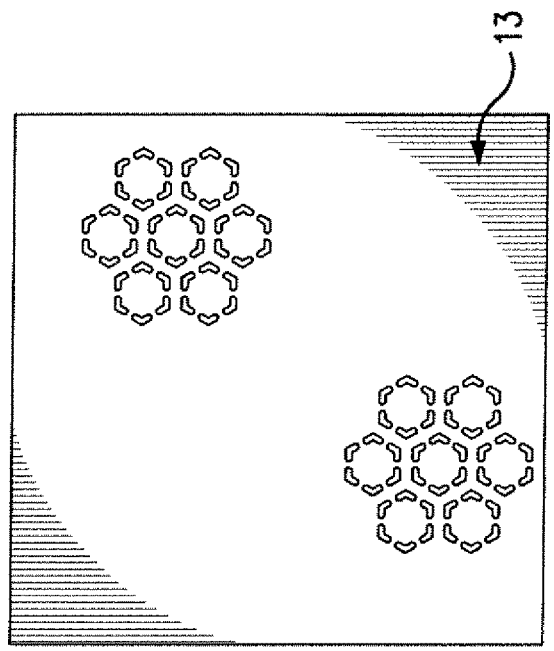
Figure 33A:
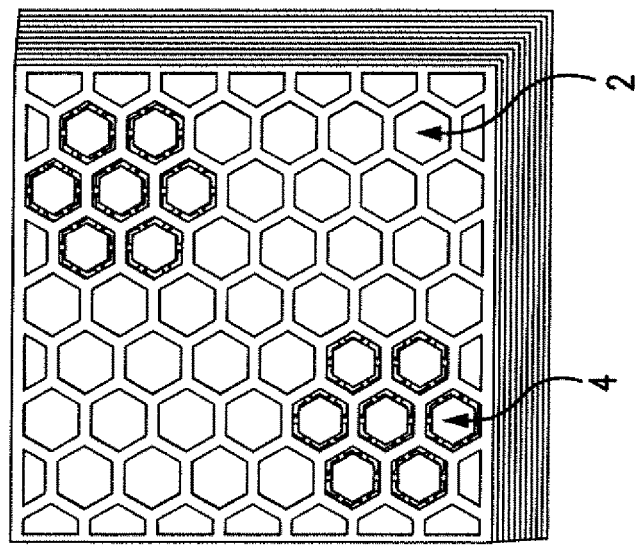

FIGS. 32*a*-*c* show photographs of an exemplary embodiment of the entrance floor system. A plurality of slots 4 provide a border around trapezoidal recessed regions 2. The recessed regions 2 are configured to receive inserts 1 (not shown). Some of the slots 4 extend between the bottom and top surfaces of the plate to allow water or debris to move from the top surface of the plate to the top surface of the base mat. FIG. 32c shows the bottom surface 13 of the plate.

Figure 34:
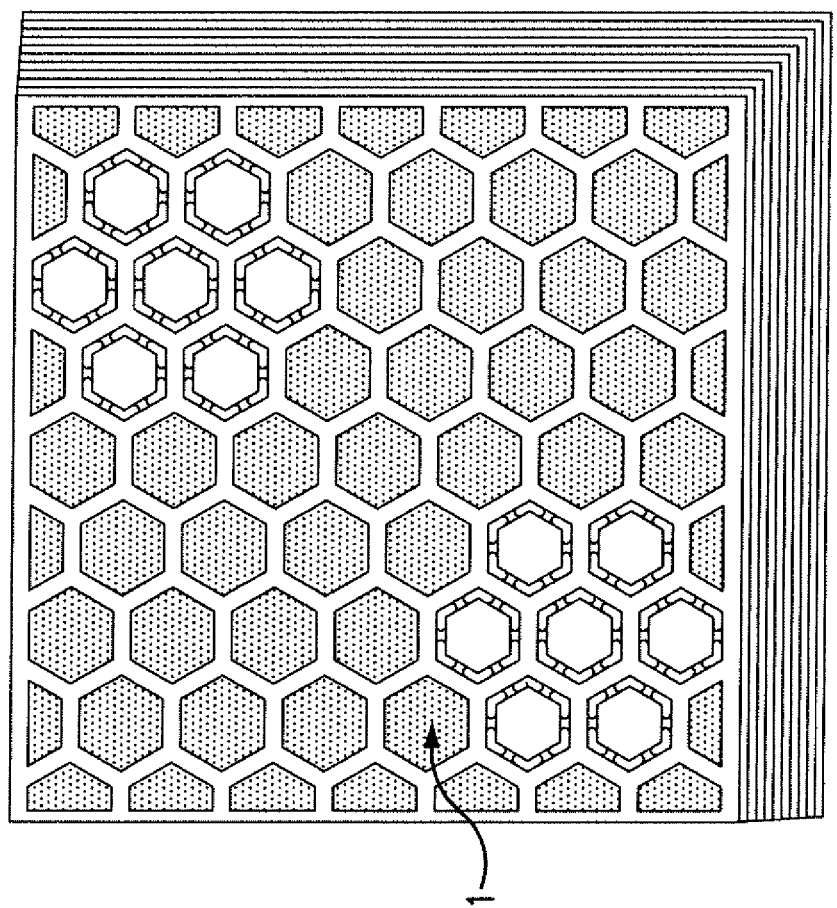
FIG. 34 is a photograph of a plate in accordance with one embodiment of the disclosed subject matter.

FIGS. 33a-c and 34, for the purpose of illustration and not limitation, show photographs of an embodiment of the entrance floor system. A plurality of slots 4 provide a honeycomb pattern (also shown in FIGS. 15-16). The recessed regions 2 are configured to receive inserts 1 (as shown in FIG. 34). Some of the slots 4 extend between the bottom and to plate-surfaces to allow water or debris to move from the top surface of the plate to the top surface of the base mat. FIG. 23c shows the bottom surface 13 of the plate.

In accordance with another aspect of the disclosed subject matter, designs for an entrance floor system are provided. For example, ornamental designs for an entrance floor system are shown in FIGS. 1-34 and described herein above.

While the disclosed subject matter is described herein in terms of certain exemplary embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalent.

The invention claimed is:

1. A method of preparing an entrance floor system comprising:
   obtaining a floor plate design;
   converting the design into instructions readable by a computer numerical control (CNC) machine;
   operating a CNC machine in accordance with the instructions to cut, drill, or mill the design into a piece of aluminum, thereby producing at least one floor plate having opposing bottom and top surfaces and a pattern comprising a plurality of slots and recess areas machined in an entirety of the top surface of the plate, wherein the top surface is configured to receive pedestrian traffic; and
   attaching a plurality of inserts to the recess areas machined in the entirety of the top surface of the plate.

2. The method of claim 1, wherein the top surface of the plate comprises a border region and a non-border region, the non-border region being substantially parallel with the bottom surface of the plate.

3. The method of claim 2, wherein the non-border region has at least a portion of the pattern machined therein comprising at least one of the plurality of slots, at least one of the slots configured to receive fluid and debris.

4. The method of claim 3, wherein the top surface of the plate in the border region comprises a transition from a floor surface to the non-border region of the top surface of the plate.

5. The method of claim 4, wherein the plate comprises a monolithic aluminum plate.

6. The method of claim 5, wherein the bottom surface of the plate is configured to rest on a top surface of a base mat.

7. The method of claim 6, further comprising cutting the base mat to substantially similar dimensions as the plate.

8. The method of claim 6, wherein operating the CNC machine produces a plurality of monolithic aluminum plates, each plate having: opposing bottom and top surfaces, the bottom surface of the plate configured to rest on the top surface of the base mat, and the top surface of the plate having a border region and a non-border region, the non-border region being substantially parallel with the bottom surface of the plate;
   wherein the non-border regions have a pattern machined therein, each pattern comprising a plurality of slots, at least one of the slots configured to receive fluid and debris;
   wherein the top surfaces of the plates in the border region comprise transitions from the floor surface to the non-border regions of the top surfaces of the plates; and
   wherein each of the plurality of plates have a least one interior side, each interior side has a length and is configured to lay adjacent to an interior side of another of the plurality of plates, the interior sides configured without a border region.

9. The method of claim 1, wherein the top surface of the plate is substantially parallel with the bottom surface of the plate; and
   the bottom surface of the plate is configured to rest on a top surface of a base mat, the base mat having a height, and opposing bottom and top surfaces, the bottom surface of the base mat configured to rest within a floor recess having a recess depth.

10. The method of claim 9, wherein the plate is a monolithic aluminum plate having a height, wherein the floor system has a total height comprising the plate height and the base mat height, the total height being substantially equal to the recess depth.

11. The method of claim 10, wherein at least one of the slots is configured to receive fluid and debris.

12. The method of claim 1, further comprising manually adjusting the design in the instructions readable by a CNC machine.

13. The method of claim 1, further comprising inputting the design into a computer aided design (CAD) program.

14. The method of claim 13, further comprising manually adjusting the design in the CAD program.

15. The method of claim 1, further comprising providing a chemical treatment to the plate.

16. The method of claim 1, further comprising anodizing the plate.

17. The method of claim 1, wherein the at least one insert is attached to the at least one recess area via a hook and loop system.

18. The method of claim 1, wherein the at least one insert is attached to the at least one recess area via an adhesive.

19. The method of claim 18, wherein the adhesive comprises a waterproof adhesive material.

20. The method of claim 1, wherein the at least one insert comprises a carpet material, a rubber material, a tape material, an abrasive strip material, or any combination thereof.

21. The method of claim 1, wherein at least a portion of at least one of the plurality of slots extends from the top surface to the bottom surface.

22. The method of claim 1, wherein a bottom of the plurality of inserts is attached to the recess areas machined in the entirety of the top surface of the plate.

23. A method of preparing an entrance floor system comprising:

obtaining a floor plate design;

converting the design into instructions readable by a computer numerical control (CNC) machine;

operating a CNC machine in accordance with the instructions to cut, drill, or mill the design into a piece of aluminum, thereby producing at least one floor plate having opposing bottom and top surfaces and a pattern comprising a plurality of slots and recess areas machined in an entirety of the top surface of the plate, wherein at least a portion of at least one of the plurality of slots extends from the top surface to the bottom surface; and attaching a plurality of inserts to the recess areas machined in the entirety of the top surface of the plate.

\* \* \* \* \*